United States Patent
Hunter et al.

(10) Patent No.: US 8,019,688 B2
(45) Date of Patent: Sep. 13, 2011

(54) MUSIC DISTRIBUTION SYSTEM AND ASSOCIATED ANTIPIRACY PROTECTIONS

(75) Inventors: Charles E. Hunter, Hilton Head, SC (US); John H. Hebrank, Durham, NC (US); Kelly C. Sparks, Morrisville, NC (US)

(73) Assignee: Ochoa Optics LLC, Las Vegas, NV (US)

( * ) Notice: Subject to any disclaimer, the term of this patent is extended or adjusted under 35 U.S.C. 154(b) by 0 days.

(21) Appl. No.: 11/085,944

(22) Filed: Mar. 21, 2005

(65) Prior Publication Data

US 2005/0182730 A1 Aug. 18, 2005

Related U.S. Application Data

(63) Continuation of application No. 09/487,978, filed on Jan. 20, 2000, now Pat. No. 6,952,685, which is a continuation-in-part of application No. 09/476,078, filed on Dec. 30, 1999, now abandoned, which is a continuation-in-part of application No. 09/436,281, filed on Nov. 8, 1999, now abandoned, which is a continuation-in-part of application No. 09/385,671, filed on Aug. 27, 1999, now abandoned.

(51) Int. Cl.
*G06F 21/00* (2006.01)
(52) U.S. Cl. .......... 705/58; 705/57; 705/50; 705/51
(58) Field of Classification Search .......... 705/58, 705/57, 50, 51
See application file for complete search history.

(56) References Cited

U.S. PATENT DOCUMENTS

| | | | |
|---|---|---|---|
| 3,373,517 A | 3/1968 | Helperin | 40/491 |
| 3,376,465 A | 4/1968 | Corpew | 315/10 |
| 3,848,193 A | 11/1974 | Martin et al. | 325/53 |
| 3,941,926 A | 3/1976 | Slobodzian et al. | 348/383 |
| 3,983,317 A | 9/1976 | Glorioso | 369/109.01 |
| 3,993,955 A | 11/1976 | Belcher et al. | 725/33 |
| 3,993,995 A | 11/1976 | Belcher et al. | |
| 4,071,857 A | 1/1978 | Whitney et al. | |
| 4,071,875 A | 1/1978 | Whitney et al. | |
| 4,094,010 A | 6/1978 | Pepperl et al. | 369/30.1 |
| 4,155,042 A | 5/1979 | Permut et al. | 340/7.5 |
| 4,230,990 A | 10/1980 | Lert et al. | |

(Continued)

FOREIGN PATENT DOCUMENTS

EP 0 683 943 B1 11/1995

(Continued)

OTHER PUBLICATIONS

"Wink Television Press Room," http://www.wink.com/contents/PressReleases.shtml, downloaded and printed on May 14, 2002.

(Continued)

*Primary Examiner* — Pierre E Elisca
(74) *Attorney, Agent, or Firm* — Woodcock Washburn LLP

(57) ABSTRACT

Music is blanket transmitted (for example, via satellite downlink transmission) to each customer's computer-based user station. Customers preselect from a list of available music in advance using an interactive screen selector, and pay only for music that they choose to have recorded for unlimited playback, for example, by a "CD burner". An "ID tag" is woven into the recorded music so that any illegal copies therefrom may be traced to the purchase transaction.

71 Claims, 5 Drawing Sheets

U.S. PATENT DOCUMENTS

| | | | |
|---|---|---|---|
| 4,332,022 A | 5/1982 | Ceshkovsky et al. | 369/44.28 |
| 4,368,485 A | 1/1983 | Midland | 348/799 |
| 4,476,488 A | 10/1984 | Merrell | 725/33 |
| 4,536,791 A | 8/1985 | Campbell et al. | 725/28 |
| 4,554,584 A | 11/1985 | Plotnick et al. | |
| 4,559,480 A | 12/1985 | Nobs | 315/324 |
| 4,575,750 A | 3/1986 | Callahan | 725/34 |
| 4,595,950 A | 6/1986 | Lofberg | 380/202 |
| 4,613,901 A | 9/1986 | Gilhousen et al. | |
| 4,654,482 A | 3/1987 | DeAngelis | 379/93.12 |
| 4,716,410 A | 12/1987 | Nozaki | 340/825.52 |
| 4,734,779 A | 3/1988 | Levis et al. | 348/383 |
| 4,734,858 A | 3/1988 | Schlafly | 705/26 |
| 4,761,641 A | 8/1988 | Schreiber | 345/1.3 |
| 4,766,581 A | 8/1988 | Korn et al. | |
| 4,789,863 A | 12/1988 | Bush | 340/5.9 |
| 4,794,465 A | 12/1988 | Van Luyt et al. | 386/100 |
| 4,797,913 A | 1/1989 | Kaplan et al. | 379/91.02 |
| 4,809,325 A | 2/1989 | Hayashi et al. | 380/234 |
| 4,812,843 A | 3/1989 | Champion, III et al. | 340/905 |
| 4,829,569 A | 5/1989 | Seth-Smith et al. | 380/234 |
| 4,845,700 A | 7/1989 | Koizumi et al. | |
| 4,847,825 A | 7/1989 | Levine | 369/47.23 |
| 4,862,268 A | 8/1989 | Campbell et al. | 348/463 |
| 4,908,713 A | 3/1990 | Levine | 386/83 |
| 4,949,187 A | 8/1990 | Cohen | 386/69 |
| 5,046,090 A | 9/1991 | Walker et al. | 380/202 |
| 5,051,822 A | 9/1991 | Rhoades | 463/25 |
| 5,073,925 A | 12/1991 | Nagata et al. | 360/60 |
| 5,105,418 A | 4/1992 | Kenmotsu et al. | |
| 5,107,122 A | 4/1992 | Osborne | 250/231.14 |
| 5,121,430 A | 6/1992 | Ganzer et al. | 380/258 |
| 5,123,046 A | 6/1992 | Levine | 380/242 |
| 5,133,079 A | 7/1992 | Ballantyne et al. | 725/146 |
| 5,182,669 A | 1/1993 | Chikuma et al. | 359/241 |
| 5,191,573 A | 3/1993 | Hair | 369/84 |
| 5,214,793 A | 5/1993 | Conway et al. | 455/500 |
| 5,233,423 A | 8/1993 | Jernigan et al. | 348/564 |
| 5,235,587 A | 8/1993 | Bearden et al. | 210/198.2 |
| 5,251,193 A | 10/1993 | Nelson et al. | 369/44.14 |
| 5,257,017 A | 10/1993 | Jones et al. | 345/13 |
| 5,260,778 A | 11/1993 | Kauffman et al. | 725/33 |
| 5,274,762 A | 12/1993 | Peterson et al. | 709/219 |
| 5,283,731 A | 2/1994 | LaLonde et al. | 705/1 |
| 5,292,568 A | 3/1994 | Tezuka et al. | |
| 5,297,204 A | 3/1994 | Levine | 380/242 |
| 5,311,423 A | 5/1994 | Clark | 705/8 |
| 5,319,735 A | 6/1994 | Preuss et al. | 704/205 |
| 5,355,302 A | 10/1994 | Martin et al. | 700/234 |
| 5,365,282 A | 11/1994 | Levine | 348/734 |
| 5,373,330 A | 12/1994 | Levine | 348/734 |
| 5,387,942 A | 2/1995 | Lemelson | |
| 5,410,344 A | 4/1995 | Graves et al. | |
| 5,414,756 A | 5/1995 | Levine | 379/88.23 |
| 5,418,713 A | 5/1995 | Allen | 705/32 |
| 5,420,647 A | 5/1995 | Levine | 348/734 |
| 5,420,923 A | 5/1995 | Beyers, II et al. | 380/234 |
| 5,428,606 A | 6/1995 | Moskowitz | 370/400 |
| 5,438,355 A | 8/1995 | Palmer | 725/110 |
| 5,440,334 A | 8/1995 | Walters et al. | 725/92 |
| 5,465,291 A | 11/1995 | Barrus et al. | 379/67.1 |
| 5,469,020 A | 11/1995 | Herrick | 313/511 |
| 5,469,206 A | 11/1995 | Strubbe et al. | 725/60 |
| 5,473,584 A | 12/1995 | Oshima | 369/47.11 |
| 5,483,278 A | 1/1996 | Strubbe et al. | 725/61 |
| 5,483,535 A | 1/1996 | McMillen et al. | 370/452 |
| 5,486,819 A | 1/1996 | Horie | 340/905 |
| 5,495,283 A | 2/1996 | Cowe | 725/33 |
| 5,497,186 A | 3/1996 | Kawasaki | 725/34 |
| 5,497,479 A | 3/1996 | Hornbuckle | 463/29 |
| 5,508,815 A | 4/1996 | Levine | 386/83 |
| 5,512,935 A | 4/1996 | Majeti et al. | 725/33 |
| 5,513,260 A | 4/1996 | Ryan | 380/200 |
| 5,530,751 A | 6/1996 | Morris | 380/202 |
| 5,532,920 A | 7/1996 | Hartrick et al. | 715/500 |
| 5,543,856 A | 8/1996 | Rosser et al. | 348/578 |
| 5,545,454 A | 8/1996 | Yamada et al. | |
| 5,550,863 A | 8/1996 | Yurt et al. | 375/240 |
| 5,557,541 A | 9/1996 | Schulhof et al. | 700/94 |
| 5,559,549 A | 9/1996 | Hendricks et al. | 725/50 |
| 5,565,909 A | 10/1996 | Thibadeau et al. | 725/35 |
| 5,566,315 A | 10/1996 | Milillo et al. | 711/113 |
| 5,568,272 A | 10/1996 | Levine | 386/48 |
| 5,572,442 A * | 11/1996 | Schulhof et al. | 709/219 |
| 5,592,511 A | 1/1997 | Schoen et al. | 375/220 |
| 5,592,551 A | 1/1997 | Lett et al. | 380/211 |
| 5,592,626 A | 1/1997 | Papadimitriou et al. | 718/102 |
| 5,598,397 A | 1/1997 | Sim | |
| 5,600,839 A | 2/1997 | MacDonald | 713/322 |
| 5,610,653 A | 3/1997 | Abecassis | 348/170 |
| 5,612,741 A | 3/1997 | Loban et al. | 348/383 |
| 5,619,247 A | 4/1997 | Russo | 725/104 |
| 5,621,840 A | 4/1997 | Kawamura et al. | 386/68 |
| 5,621,863 A | 4/1997 | Boulet et al. | 706/26 |
| 5,627,895 A | 5/1997 | Owaki | 380/54 |
| 5,628,050 A | 5/1997 | McGraw et al. | 455/12.1 |
| 5,630,067 A | 5/1997 | Kindell et al. | 709/231 |
| 5,638,113 A | 6/1997 | Lappington et al. | 725/141 |
| 5,640,453 A | 6/1997 | Schuchman et al. | 380/211 |
| 5,644,859 A | 7/1997 | Hsu | 40/545 |
| 5,646,603 A | 7/1997 | Nagata et al. | 340/825.25 |
| 5,646,997 A | 7/1997 | Barton | 713/176 |
| 5,654,747 A | 8/1997 | Ottesen et al. | 725/1 |
| 5,659,366 A | 8/1997 | Kerman | 725/34 |
| 5,659,613 A | 8/1997 | Copeland et al. | 380/202 |
| 5,661,516 A | 8/1997 | Carles | 725/35 |
| 5,664,018 A | 9/1997 | Leighton | 380/54 |
| 5,675,734 A | 10/1997 | Hair | 705/26 |
| 5,682,206 A | 10/1997 | Wehmeyer et al. | 725/58 |
| 5,684,918 A | 11/1997 | Abecassis | 386/83 |
| 5,686,954 A | 11/1997 | Yoshinobu et al. | 725/43 |
| 5,689,799 A | 11/1997 | Dougherty et al. | 455/2.01 |
| 5,692,214 A | 11/1997 | Levine | 710/13 |
| 5,701,161 A | 12/1997 | Williams et al. | 348/468 |
| 5,701,383 A | 12/1997 | Russo et al. | 386/46 |
| 5,701,397 A | 12/1997 | Steimle et al. | 706/41 |
| 5,710,869 A | 1/1998 | Godefray et al. | 706/41 |
| 5,717,814 A | 2/1998 | Abecassis | 386/46 |
| 5,717,832 A | 2/1998 | Steimle et al. | 706/33 |
| 5,721,827 A | 2/1998 | Logan et al. | 709/217 |
| 5,721,951 A | 2/1998 | DorEl | 710/10 |
| 5,724,062 A | 3/1998 | Hunter | 345/102 |
| 5,724,091 A | 3/1998 | Freeman et al. | 725/138 |
| 5,724,525 A | 3/1998 | Beyers, II et al. | 705/40 |
| 5,729,214 A | 3/1998 | Moore | 340/905 |
| 5,734,413 A | 3/1998 | Lappington et al. | 725/141 |
| 5,734,720 A | 3/1998 | Salganicoff | 380/211 |
| 5,734,781 A | 3/1998 | Cantone | |
| 5,740,326 A | 4/1998 | Boulet et al. | 706/27 |
| 5,745,569 A | 4/1998 | Moskowitz et al. | |
| 5,748,716 A | 5/1998 | Levine | 379/102.03 |
| 5,758,257 A | 5/1998 | Herz et al. | 725/116 |
| 5,760,820 A | 6/1998 | Eda et al. | 725/33 |
| 5,761,606 A | 6/1998 | Wolzien | 725/110 |
| 5,761,721 A | 6/1998 | Baldus et al. | 711/141 |
| 5,771,334 A | 6/1998 | Yamauchi et al. | |
| 5,781,734 A | 7/1998 | Ohno et al. | 725/115 |
| 5,790,202 A | 8/1998 | Kummer et al. | 348/553 |
| 5,790,935 A | 8/1998 | Payton | 422/186 |
| 5,790,937 A | 8/1998 | Gutle | 725/135 |
| 5,799,285 A | 8/1998 | Klingman | 705/26 |
| 5,805,154 A | 9/1998 | Brown | 715/717 |
| 5,805,763 A | 9/1998 | Lawler et al. | 386/83 |
| 5,809,139 A | 9/1998 | Girod et al. | 380/202 |
| 5,815,484 A | 9/1998 | Smith et al. | |
| 5,815,662 A | 9/1998 | Ong | 725/92 |
| 5,818,806 A | 10/1998 | Wong et al. | 369/53.33 |
| 5,822,291 A | 10/1998 | Brindze et al. | |
| 5,822,432 A | 10/1998 | Moskowitz et al. | 380/28 |
| 5,825,407 A | 10/1998 | Cowe et al. | 725/143 |
| 5,826,123 A | 10/1998 | Lai | 396/446 |
| 5,828,402 A | 10/1998 | Collings | |
| RE35,954 E | 11/1998 | Levine | 380/242 |
| 5,832,287 A | 11/1998 | Atalla | 709/231 |
| 5,835,896 A | 11/1998 | Fisher et al. | 705/37 |
| 5,841,979 A | 11/1998 | Schulhof et al. | 709/237 |
| 5,845,083 A | 12/1998 | Hamadani et al. | 709/231 |

| Patent No. | Date | Inventor | Class |
|---|---|---|---|
| 5,848,129 A | 12/1998 | Baker | 379/67.1 |
| 5,848,155 A | 12/1998 | Cox | 382/191 |
| 5,848,352 A | 12/1998 | Dougherty et al. | 725/110 |
| 5,854,779 A | 12/1998 | Johnson et al. | 369/59.18 |
| 5,857,020 A | 1/1999 | Peterson, Jr. | 705/52 |
| 5,860,068 A | 1/1999 | Cook | 705/26 |
| 5,862,260 A | 1/1999 | Rhoads | 382/232 |
| 5,870,717 A | 2/1999 | Wiecha | 705/26 |
| 5,874,985 A | 2/1999 | Matthews, III | 725/32 |
| 5,878,017 A | 3/1999 | Ikegame | |
| 5,884,284 A | 3/1999 | Peters et al. | |
| 5,889,868 A | 3/1999 | Moskowitz et al. | 713/176 |
| 5,890,136 A | 3/1999 | Kipp | 705/22 |
| 5,897,622 A | 4/1999 | Blinn et al. | 705/26 |
| 5,898,384 A | 4/1999 | Alt et al. | 340/825.36 |
| 5,899,980 A | 5/1999 | Wilf et al. | 705/26 |
| 5,903,262 A | 5/1999 | Ichihashi et al. | |
| 5,903,878 A | 5/1999 | Talati | 705/26 |
| 5,905,713 A | 5/1999 | Anderson et al. | 370/241 |
| 5,905,800 A | 5/1999 | Moskowitz et al. | 380/28 |
| 5,909,492 A | 6/1999 | Payne et al. | 705/78 |
| 5,914,712 A | 6/1999 | Sartain et al. | |
| 5,914,774 A | 6/1999 | Ota | |
| 5,915,018 A | 6/1999 | Aucsmith | 380/201 |
| 5,915,027 A | 6/1999 | Cox et al. | 380/54 |
| 5,915,068 A | 6/1999 | Levine | 386/83 |
| 5,918,213 A | 6/1999 | Bernard et al. | 705/26 |
| 5,930,369 A | 7/1999 | Cox et al. | 380/54 |
| 5,931,901 A | 8/1999 | Wolfe et al. | 709/206 |
| 5,933,499 A | 8/1999 | Enari | |
| 5,933,798 A | 8/1999 | Linnartz | 702/191 |
| 5,934,795 A | 8/1999 | Rykowski et al. | 362/309 |
| 5,940,135 A | 8/1999 | Petrovic et al. | 348/473 |
| 5,940,807 A | 8/1999 | Purcell | 705/26 |
| 5,943,670 A | 8/1999 | Prager | 707/5 |
| 5,946,665 A | 8/1999 | Suzuki et al. | 705/26 |
| 5,949,885 A | 9/1999 | Leighton | 380/54 |
| 5,956,716 A | 9/1999 | Kenner et al. | 707/10 |
| 5,959,885 A | 9/1999 | Kameswara | 365/185.07 |
| 5,959,945 A * | 9/1999 | Kleiman | 381/81 |
| 5,960,081 A | 9/1999 | Vynne et al. | 713/176 |
| 5,960,411 A | 9/1999 | Hartman et al. | 705/26 |
| 5,963,217 A | 10/1999 | Grayson et al. | 345/473 |
| 5,963,264 A | 10/1999 | Jackson | 348/460 |
| 5,963,915 A | 10/1999 | Kirsch | 705/26 |
| 5,963,917 A | 10/1999 | Ogram | 705/26 |
| 5,966,440 A | 10/1999 | Hair | 705/26 |
| 5,966,697 A | 10/1999 | Fergerson et al. | 705/26 |
| 5,969,283 A * | 10/1999 | Looney et al. | 84/609 |
| 5,969,715 A | 10/1999 | Dougherty et al. | 725/110 |
| 5,970,471 A | 10/1999 | Hill | 705/26 |
| 5,970,472 A | 10/1999 | Allsop et al. | 705/26 |
| 5,970,473 A | 10/1999 | Gerszberg et al. | 705/26 |
| 5,970,474 A | 10/1999 | Leroy et al. | 705/27 |
| 5,970,475 A | 10/1999 | Barnes et al. | 705/27 |
| 5,974,396 A | 10/1999 | Anderson et al. | 705/10 |
| 5,978,775 A | 11/1999 | Chen | 705/26 |
| 5,983,199 A | 11/1999 | Kaneko | 705/26 |
| 5,983,200 A | 11/1999 | Slotznick | 705/26 |
| 5,983,201 A | 11/1999 | Fay | 705/27 |
| 5,988,078 A | 11/1999 | Levine | 715/721 |
| 5,991,399 A | 11/1999 | Graunke et al. | |
| 5,992,888 A | 11/1999 | North et al. | 283/56 |
| 6,002,772 A | 12/1999 | Saito | 705/58 |
| 6,005,938 A | 12/1999 | Banker et al. | 380/239 |
| 6,006,332 A | 12/1999 | Rabne et al. | 713/201 |
| 6,011,722 A | 1/2000 | Bude et al. | |
| 6,012,086 A | 1/2000 | Lowell | 709/218 |
| 6,013,007 A | 1/2000 | Root et al. | 482/8 |
| 6,014,491 A | 1/2000 | Hair | 386/31 |
| 6,023,451 A | 2/2000 | Kashiwagi et al. | |
| 6,025,868 A | 2/2000 | Russo | 725/104 |
| 6,029,045 A | 2/2000 | Picco et al. | |
| 6,029,141 A | 2/2000 | Bezos et al. | 725/27 |
| 6,032,130 A | 2/2000 | Alloul et al. | 705/27 |
| 6,041,316 A | 3/2000 | Allen | |
| 6,044,047 A | 3/2000 | Kulas | 369/34.01 |
| 6,052,554 A | 4/2000 | Hendricks et al. | 725/109 |
| 6,061,440 A | 5/2000 | Delaney et al. | 379/202.01 |
| 6,064,980 A | 5/2000 | Jacobi et al. | 705/26 |
| 6,067,107 A | 5/2000 | Travaille et al. | 725/24 |
| 6,067,532 A | 5/2000 | Gebb | 705/37 |
| 6,069,868 A | 5/2000 | Kashiwagi | 369/275.1 |
| 6,072,982 A | 6/2000 | Haddad | |
| 6,073,372 A | 6/2000 | Davis | 40/124.16 |
| 6,081,785 A | 6/2000 | Oshima et al. | 705/1 |
| 6,088,455 A | 7/2000 | Logan et al. | 380/200 |
| 6,088,722 A | 7/2000 | Herz et al. | 709/217 |
| 6,091,883 A | 7/2000 | Artigalas et al. | 386/83 |
| 6,112,192 A | 8/2000 | Capek | |
| 6,115,348 A | 9/2000 | Guerra | 369/112.26 |
| 6,118,976 A | 9/2000 | Arias et al. | |
| 6,119,096 A | 9/2000 | Mann et al. | 705/5 |
| 6,122,403 A | 9/2000 | Rhoads | |
| 6,131,130 A | 10/2000 | Van Ryzin | |
| 6,141,530 A | 10/2000 | Rabowsky | 725/116 |
| 6,147,715 A | 11/2000 | Yuen et al. | |
| 6,148,033 A | 11/2000 | Pearlstein et al. | |
| 6,148,142 A | 11/2000 | Anderson | 386/125 |
| 6,148,428 A | 11/2000 | Welch et al. | 714/752 |
| 6,150,964 A | 11/2000 | McLaughlin | 341/59 |
| 6,151,600 A | 11/2000 | Dedrick | 707/10 |
| 6,175,840 B1 | 1/2001 | Chen et al. | 707/501.1 |
| 6,177,931 B1 | 1/2001 | Alexander et al. | 725/52 |
| 6,198,875 B1 | 3/2001 | Edenson et al. | |
| 6,201,777 B1 | 3/2001 | Tsuchiya et al. | |
| 6,209,787 B1 | 4/2001 | Iida | |
| 6,226,618 B1 | 5/2001 | Downs et al. | |
| 6,228,440 B1 | 5/2001 | Dailey et al. | |
| 6,229,453 B1 | 5/2001 | Gardner et al. | 340/853.8 |
| 6,233,389 B1 | 5/2001 | Barton et al. | 386/46 |
| 6,233,682 B1 | 5/2001 | Fritsch | 713/168 |
| 6,238,763 B1 | 5/2001 | Sandstrom | |
| 6,240,401 B1 | 5/2001 | Oren et al. | 705/40 |
| 6,243,350 B1 | 6/2001 | Knight et al. | |
| 6,247,047 B1 | 6/2001 | Wolff | |
| 6,247,130 B1 | 6/2001 | Fritsch | 713/171 |
| 6,249,532 B1 | 6/2001 | Yoshikawa et al. | 370/486 |
| 6,265,424 B1 | 7/2001 | Tisdell et al. | |
| 6,269,394 B1 | 7/2001 | Kenner et al. | 709/217 |
| 6,272,636 B1 | 8/2001 | Neville et al. | 713/189 |
| 6,288,753 B1 | 9/2001 | DeNicola et al. | |
| 6,297,859 B1 | 10/2001 | Barrett | |
| 6,343,738 B1 | 2/2002 | Ogilvie | |
| 6,363,356 B1 | 3/2002 | Horstmann | |
| 6,385,596 B1 | 5/2002 | Wiser et al. | 705/51 |
| 6,400,996 B1 | 6/2002 | Hoffberg et al. | 700/83 |
| 6,405,203 B1 | 6/2002 | Collart | |
| 6,408,313 B1 | 6/2002 | Campbell et al. | 707/205 |
| 6,424,998 B2 | 7/2002 | Hunter | 709/207 |
| 6,430,603 B2 | 8/2002 | Hunter | 709/207 |
| 6,430,605 B2 | 8/2002 | Hunter | 709/207 |
| 6,438,579 B1 | 8/2002 | Hosken | 709/203 |
| 6,453,420 B1 | 9/2002 | Collart | |
| 6,456,331 B2 | 9/2002 | Kwoh | 348/465 |
| 6,463,467 B1 | 10/2002 | Mages et al. | 709/218 |
| 6,493,874 B2 | 12/2002 | Humpleman | 725/78 |
| 6,496,822 B2 | 12/2002 | Rosenfelt et al. | 707/9 |
| 6,504,798 B1 | 1/2003 | Revis | |
| 6,519,341 B1 | 2/2003 | Enari | |
| 6,519,571 B1 * | 2/2003 | Guheen et al. | 705/14 |
| 6,522,769 B1 | 2/2003 | Rhoads et al. | 382/100 |
| 6,529,526 B1 | 3/2003 | Schneidewend | |
| 6,549,719 B2 | 4/2003 | Mankovitz | 386/83 |
| 6,574,424 B1 | 6/2003 | Dimitri et al. | |
| 6,604,240 B2 | 8/2003 | Ellis et al. | 725/45 |
| 6,606,744 B1 | 8/2003 | Mikurak | |
| 6,611,820 B2 | 8/2003 | Oshima et al. | 705/56 |
| 6,621,933 B2 | 9/2003 | Chung et al. | |
| 6,625,333 B1 | 9/2003 | Wang et al. | 382/300 |
| 6,637,029 B1 | 10/2003 | Maissel et al. | |
| 6,641,886 B1 | 11/2003 | Bakos et al. | |
| 6,647,417 B1 | 11/2003 | Hunter et al. | 709/225 |
| 6,662,231 B1 | 12/2003 | Drosset et al. | |
| 6,681,326 B2 | 1/2004 | Son et al. | 713/150 |
| 6,697,948 B1 | 2/2004 | Rabin et al. | |
| 6,708,157 B2 | 3/2004 | Stefik et al. | 705/59 |
| 6,718,551 B1 | 4/2004 | Swix et al. | |

| | | |
|---|---|---|
| 6,728,271 B1 | 4/2004 | Kawamura et al. |
| 6,728,713 B1 | 4/2004 | Beach et al. |
| 6,732,366 B1 | 5/2004 | Russo |
| 6,735,251 B2 | 5/2004 | Sugahara |
| 6,756,997 B1 | 6/2004 | Ward et al. |
| 6,760,442 B1 | 7/2004 | Scott |
| 6,769,020 B2 | 7/2004 | Miyazaki et al. ............ 709/219 |
| 6,772,331 B1 | 8/2004 | Hind et al. |
| 6,778,678 B1 | 8/2004 | Podilchuk et al. |
| 6,783,886 B1 | 8/2004 | Hunter et al. |
| 6,792,007 B1 | 9/2004 | Hamada et al. |
| 6,799,326 B2 | 9/2004 | Boylan et al. |
| 6,810,131 B2 | 10/2004 | Nakagawa et al. |
| 6,829,301 B1 | 12/2004 | Tinker et al. |
| 6,829,368 B2 | 12/2004 | Meyer et al. ................ 382/100 |
| 6,842,522 B1 | 1/2005 | Downing |
| 6,850,901 B1 | 2/2005 | Hunter et al. |
| 6,881,465 B2 | 4/2005 | Ogawa et al. |
| 6,889,383 B1 | 5/2005 | Jarman |
| 6,928,423 B1 | 8/2005 | Yamanaka |
| 6,931,534 B1 | 8/2005 | Jandel et al. |
| 6,931,657 B1 | 8/2005 | Marsh |
| 6,948,070 B1 | 9/2005 | Ginter et al. |
| 6,952,685 B1 | 10/2005 | Hunter et al. |
| 6,956,833 B1 | 10/2005 | Yukie et al. |
| 6,959,220 B1 | 10/2005 | Wiser et al. |
| 7,006,974 B2 | 2/2006 | Burchard et al. |
| 7,032,237 B2 | 4/2006 | Tsunoda et al. |
| 7,047,302 B1 | 5/2006 | Chatani et al. |
| 7,120,800 B2 | 10/2006 | Ginter et al. |
| 7,155,733 B2 | 12/2006 | Rodriguez et al. |
| 7,169,334 B2 | 1/2007 | Yamamoto et al. |
| 7,191,153 B1 | 3/2007 | Braitberg et al. |
| 7,197,758 B1 | 3/2007 | Blackketter et al. |
| 7,209,900 B2 | 4/2007 | Hunter et al. |
| 7,233,781 B2 | 6/2007 | Hunter et al. |
| 7,263,188 B2 | 8/2007 | Kohno |
| 7,263,497 B1 | 8/2007 | Wiser et al. |
| 7,269,634 B2 | 9/2007 | Getsin et al. |
| 7,313,802 B1 | 12/2007 | Tomsen |
| 7,370,016 B1 | 5/2008 | Hunter et al. |
| 7,428,639 B2 | 9/2008 | Demos |
| 7,440,674 B2 | 10/2008 | Plotnick et al. |
| 7,487,128 B2 | 2/2009 | Spagna et al. |
| 7,499,564 B2 | 3/2009 | Rhoads |
| 7,539,110 B2 | 5/2009 | Mizuno et al. |
| 2001/0003846 A1 | 6/2001 | Rowe et al. ................ 725/47 |
| 2001/0010045 A1 | 7/2001 | Stefik et al. ................ 705/51 |
| 2001/0013037 A1 | 8/2001 | Matsumoto ................ 707/5 |
| 2001/0013120 A1 | 8/2001 | Tsukamoto ................ 725/5 |
| 2001/0016836 A1 | 8/2001 | Boccon-Gibod et al. ........ 705/51 |
| 2001/0018742 A1 | 8/2001 | Hirai ................ 713/193 |
| 2001/0018858 A1 | 9/2001 | Dwek ................ 84/609 |
| 2001/0023416 A1 | 9/2001 | Hosokawa ................ 705/51 |
| 2001/0023417 A1 | 9/2001 | Stefik et al. ................ 705/57 |
| 2001/0024425 A1 | 9/2001 | Tsunoda et al. ............... 370/82 |
| 2001/0025259 A1 | 9/2001 | Rouchon ................ 705/26 |
| 2001/0025269 A1 | 9/2001 | Otsuka ................ 705/52 |
| 2001/0025316 A1 | 9/2001 | Oh ................ 709/231 |
| 2001/0027561 A1 | 10/2001 | White et al. ................ 725/1 |
| 2001/0027563 A1 | 10/2001 | White et al. ................ 725/46 |
| 2001/0029491 A1 | 10/2001 | Yoneta et al. ................ 705/53 |
| 2001/0029538 A1 | 10/2001 | Blockton et al. ................ 709/226 |
| 2001/0029583 A1 | 10/2001 | Palatov et al. ................ 713/193 |
| 2001/0030660 A1 | 10/2001 | Zainoulline ................ 715/720 |
| 2001/0032131 A1 | 10/2001 | Mowry ................ 705/14 |
| 2001/0032132 A1 | 10/2001 | Moran ................ 705/14 |
| 2001/0032133 A1 | 10/2001 | Moran ................ 705/14 |
| 2001/0032187 A1 | 10/2001 | Nuttall ................ 705/57 |
| 2001/0032312 A1 | 10/2001 | Runje et al. ................ 713/172 |
| 2001/0034635 A1 | 10/2001 | Winters ................ 705/10 |
| 2001/0034714 A1 | 10/2001 | Terao et al. ................ 705/57 |
| 2001/0034883 A1 | 10/2001 | Zigmond ................ 725/109 |
| 2001/0037465 A1 | 11/2001 | Hart et al. |
| 2001/0042043 A1 | 11/2001 | Shear et al. |
| 2001/0047298 A1 | 11/2001 | Moore et al. |
| 2002/0028024 A1 | 3/2002 | Jayant et al. |
| 2002/0056112 A1 | 5/2002 | Dureau et al. ................ 725/78 |
| 2002/0056118 A1 | 5/2002 | Hunter et al. ................ 725/87 |
| 2002/0057799 A1 | 5/2002 | Kohno ................ 380/228 |
| 2002/0062261 A1 | 5/2002 | Mukai ................ 705/26 |
| 2002/0066025 A1 | 5/2002 | Sato et al. ................ 713/200 |
| 2002/0095357 A1 | 7/2002 | Hunter et al. |
| 2002/0100043 A1 | 7/2002 | Lowthert et al. |
| 2002/0103699 A1 | 8/2002 | Figueiras Ferreiro |
| 2002/0112235 A1 | 8/2002 | Ballou et al. |
| 2002/0112243 A1 | 8/2002 | Hunter et al. |
| 2002/0120925 A1 | 8/2002 | Logan |
| 2002/0124251 A1 | 9/2002 | Hunter et al. |
| 2002/0184047 A1 | 12/2002 | Plotnick et al. |
| 2003/0004796 A1 | 1/2003 | Struble |
| 2003/0028888 A1 | 2/2003 | Hunter et al. |
| 2003/0036974 A1 | 2/2003 | Allen |
| 2003/0061607 A1 | 3/2003 | Hunter et al. |
| 2003/0067554 A1 | 4/2003 | Klarfeld et al. |
| 2003/0115137 A1* | 6/2003 | Rowe ................ 705/39 |
| 2003/0133692 A1 | 7/2003 | Hunter ................ 386/35 |
| 2003/0149989 A1 | 8/2003 | Hunter et al. |
| 2004/0083492 A1 | 4/2004 | Goode et al. |
| 2004/0103439 A1 | 5/2004 | Macrae et al. |
| 2005/0010949 A1 | 1/2005 | Ward et al. |
| 2005/0182730 A1 | 8/2005 | Hunter et al. |
| 2006/0195548 A1 | 8/2006 | Hunter et al. |
| 2006/0212892 A1 | 9/2006 | Hunter et al. |
| 2006/0212908 A1 | 9/2006 | Hunter et al. |
| 2006/0225332 A1 | 10/2006 | Zenisek |
| 2006/0229904 A1 | 10/2006 | Hunter et al. |
| 2006/0294016 A1 | 12/2006 | Hunter et al. |
| 2007/0028276 A1 | 2/2007 | Inoue et al. |
| 2007/0110240 A1 | 5/2007 | Moskowitz et al. |
| 2007/0186272 A1 | 8/2007 | Hunter et al. |
| 2007/0234391 A1 | 10/2007 | Hunter et al. |
| 2007/0276740 A1 | 11/2007 | Hunter et al. |
| 2008/0133379 A1* | 6/2008 | Rowe ................ 705/26 |
| 2009/0099968 A1 | 4/2009 | Hunter et al. |

FOREIGN PATENT DOCUMENTS

| | | |
|---|---|---|
| EP | 0 756 423 A1 | 1/1997 |
| EP | 0 954 176 A2 | 11/1999 |
| EP | 0 954 179 A2 | 11/1999 |
| EP | 0 975 111 A2 | 1/2000 |
| EP | 0 977 389 A2 | 2/2000 |
| EP | 0 984 631 A1 | 3/2000 |
| EP | 0 994 470 A2 | 4/2000 |
| EP | 1252732 B1 | 1/2001 |
| EP | 1 104 195 A2 | 5/2001 |
| EP | 1 143 721 A1 | 10/2001 |
| EP | 1226715 B1 | 4/2008 |
| JP | 360253082 | 12/1985 |
| JP | 407143081 A | 6/1995 |
| JP | 410290441 | 10/1998 |
| JP | 2002015333 | 1/2002 |
| JP | 2002099283 | 4/2002 |
| JP | 2002156979 | 5/2002 |
| TW | 503657 | 8/2000 |
| TW | 90101479 | 1/2001 |
| TW | 527835 | 3/2001 |
| WO | WO 91/03112 | 3/1991 |
| WO | WO 92/22983 | 12/1992 |
| WO | WO 94/13107 | 6/1994 |
| WO | WO 96/26605 | 8/1996 |
| WO | WO 96/34467 | 10/1996 |
| WO | WO 96/34494 | 10/1996 |
| WO | WO 98/26357 | 6/1998 |
| WO | WO 98/27732 | 6/1998 |
| WO | WO 99/18518 | 4/1999 |
| WO | WO 99/18727 | 4/1999 |
| WO | WO 99/31842 | 6/1999 |
| WO | WO 01/01677 | 1/2000 |
| WO | WO 00/05886 | 2/2000 |
| WO | WO 00/07368 | 2/2000 |
| WO | WO 00/14965 | 3/2000 |
| WO | WO 01/017242 | 3/2001 |
| WO | WO 01/17242 | 3/2001 |
| WO | WO 01/41013 | 6/2001 |
| WO | WO 01/47249 | 6/2001 |
| WO | WO 01/54324 | 7/2001 |
| WO | WO 01/54410 | 7/2001 |

| | | |
|---|---|---|
| WO | WO 01/74050 | 10/2001 |
| WO | WO 01/82625 | 11/2001 |
| WO | WO 02/65750 | 8/2002 |

OTHER PUBLICATIONS

"Wink Announces First National Advertising Partners: AT&T, Levi Strauss & Co., and GE," http://www.wink.com/contents/PressReleases/930708938/content.shtml, downloaded and printed on May 14, 2002, dated Sep. 9, 1998.

"Wink Communications, Inc., Changes the Advertising Landscape," http://www.wink.com/contents/PressReleases/930709807/content.shtml, downloaded and printed on May 14, 2002, dated Jan. 21, 1999.

"Wink's History," http://www.wink.com/contents/history.shtml, downloaded and printed on May 14, 2002.

"How Wink Works," http://www.wink.com/contents/howitworks.shtml, downloaded and printed on May 14, 2002.

"What is Wink: Examples," http://www.wink.com/contents/examples.shtml, downloaded and printed on May 14, 2002.

"The Wink System." http://www.wink.com/contents/tech_diagram.shtml, downloaded and printed on May 14, 2002.

"Wink Response Server and Wink Response Network," http://www.wink.com/contents/tech_wrs.shtml, downloaded and printed on May 14, 2002.

"ICAP and HTML (ATVEF)," http://www.wink.com/contents/tech_icap.shtml. downloaded and printed on May 14, 2002.

"Wink Studio and Wink Server Studio," http;//www.wink.com/contents/tech_studio.shtml, downloaded and printed on May 14, 2002.

"Wink Broadcast Server," http://www.wink.com/contents/tech_wbs.shtml, downloaded and printed on May 14, 2002.

"Wink Client Software," http://www.wink.com/contents/tech_engine.shtml, downloaded and printed on May 14, 2002.

"DataPlay, Inc.—Universal Recording Media—Discover," http://www/dataplay.com/jsp_files/en/discover/index-music.jsp, downloaded and printed on May 14, 2002, (Copyright 2001).

"DataPlay, Inc.—Universal Recording Media—What's Playing on DataPlay," http://www/dataplay.com/servlets/ProductList?action=productSearch, downloaded and printed on May 14, 2002, (Copyright 2001).

"DataPlay, Inc.—Universal Recording Media—What's Playing on DataPlay," http://www.dataplay.com/jsp_files/en/whatsplaying/products.jsp, downloaded and printed on May 14, 2002, (Copyright 2001).

"DataPlay, Inc.—Universal Recording Media—What's Playing on DataPlay," http://www.dataplay.com/jsp_files/en/whatsplaying/products.jsp?action=details, downloaded and printed on May 14, 2002, (Copyright 2001).

"DataPlay, Inc.—Universal Recording Media—Industry," http://www.dataplay.com/jsp_files/en/industry/products-digitalmedia.jsp, downloaded and printed on May 14, 2002. (Copyright 2001).

"DataPlay, Inc.—Universal Recording Media—Industry," http://www.dataplay.com/jsp_files/en/industry/products-engines.jsp, downloaded and printed on May 14, 2002. (Copyright 2001).

"DataPlay, Inc.—Universal Recording Media—Industry," http://www.dataplay.com/jsp_files/en/industry.contentproviders.jsp, downloaded and printed on May 14, 2002. (Copyright 2001).

"DataPlay, Inc.—Universal Recording Media—Industry," http://www.dataplay.com/jsp_files/en/industry/products-contentkey.jsp, downloaded and printed on May 14, 2002. (Copyright 2001).

"DataPlay, Inc.—Universal Recording Media—Industry," http://www.dataplay.com/jsp_files/en/industry/index.jsp, downloaded and printed on May 14, 2002. (Copyright 2001).

"What's Playing on DataPlay—Everything Digital," DataPlay Micro-optical Engine Product Brochure, downloaded and printed on May 14, 2002, (Copyright 2000-2002).

"What's Playing on DataPlay—Everything Digital," DataPlay Digital Media Product Brochure, downloaded and printed on May 14, 2002, (Copyright 2000-2001).

"Onsale Invoice," http://www.onsale.com/cgi-win/invoice.exe, dated Jan. 19, 1998, printed Jan. 20, 1998, (Copyright 1997).

Onsale Packing Sheet (Jason Deep Space Series 225 × 60 Astronomy Telescope), received Jul. 1999.

Egghead Packing Receipt (Franklin Rex Organizer), received Dec. 1999.

"Sell Goods to Egghead.com." http://www.egghead.com/ShowPage.dll?page=hd_aboutus_sellgoods_p, printed Sep. 29, 2001.

"Demographics profile," http://www.egghead.com/ShowPage.dll?page=hd_aboutus_demo_p, printed Sep. 29, 2001.

"About us," http://www.egghead.com/ShowPage.dll?page=hd_aboutus_aboutus_p, printed Sep. 29, 2001.

"Privacy and Security Policy," http://www.egghead.com/ShowPage.dll?page=hd_policy_policyandprivacy_p, printed Sep. 29, 2001.

"Registration," http://www.egghead.com/ShowPage.dll?page=reg_page1_ceos&S=1, printed Sep. 26, 2001.

"New Credit Information," https://secure.fairmarket.com/secure/Cre...FM1001, printed Sep. 26, 2001.

"Quadrant 256MB, PC133 (PC-100 Compatible), 32×64, 7ns, 168-Pin, SdRAM DIMM Module (New)," wysiwyg://253/http://auctions.egghead.com...LotNo=65659811&BatchNo=0, printed Sep. 24, 2001.

"Ashton Digital VisionGate 52 15.1' TFT-LCD, Pivot Screen, USB Hub, w/Speakers," wysiwyg://253/http://auctions.egghead.com...LotNo=66044439, printed Sep. 26, 2001.

"Login/Logout," http://www.egghead.com/ShowPage.dll?page...44439, printed Sep. 29, 2001.

"Enter Your Bid." wysiwyg://218/http://auctions.egghead.com...5a99, printed Sep. 29, 2001.

"Enter Your Bid," https://auctions.egghead.com/scripts/...LotNo=66044439, printed Sep. 29, 2001.

"Confirm Your Bid." wysiwyg:/220/http://auctions.egghead.com...ShipCountry=US, printed Sep. 29, 2001.

"Bid Receipt for Bid No. 5270411," wysiwyg:/220/http://auctions.egghead.com...KioskListing=0, printed Sep. 29, 2001.

"Universal Product Code (UPC) and EAN Article Numbering Code (EAN) Page," http://www.adams1.com/pub/russadam/upccode.html, by Russ Adams, printed Sep. 24, 2001.

"Internet Archive Way Back Machine- Searched for http://www.egghead.com," printed Apr. 8, 2002. (Copyright 2001).

"Internet Archive Way Back Machine- Searched for http://www.onsale.com," printed Apr. 8, 2002, (Copyright 2001).

"Calimetrics' Multilevel Technology Enables Higher-Performance CD/DVD Recorders: An IDC White Paper," Wolfgang Schlichting, (Copyright 2000).

"Making Digital Cinema Actually Happen- What it Takes and Who's Going to Do It," Steven A Morley, (Copyright 1998).

"Streaming Onto the Movie Screen, with Nary a Scratch," Karen J. Bannan, The New York Times, May 9, 2002, p. E5.

IBM Technical Disclosure Bulletin, "Multimedia Audio on Demand," 1994, 37, 1 page (Abstract only).

U.S. Appl. No. 09/385,671 Charles Eric Hunter, filed Aug. 27, 1999.

U.S. Appl. No. 09/476,078 Charles Eric Hunter, filed Dec. 30, 1999.

U.S. Appl. No. 09/487,978 Charles Eric Hunter et al., filed Jan. 20, 2000.

U.S. Appl. No. 09/493,854 Charles Eric Hunter et al., filed Jan. 28, 2000.

U.S. Appl. No. 09/553,524 Charles Eric Hunter et al., filed Apr. 20, 2000.

U.S. Appl. No. 09/645,087 Charles Eric Hunter et al., filed Aug. 24, 2000.

U.S. Appl. No. 09/675,025 Charles Eric Hunter et al., filed Sep. 28, 2000.

U.S. Appl. No. 09/684,442 Charles Eric Hunter et al., filed Oct. 6, 2000.

U.S. Appl. No. 09/707,273 Charles Eric Hunter et al., filed Nov. 6, 2000.

U.S. Appl. No. 09/737,826 Charles Eric Hunter et al., filed Dec. 15, 2000.

U.S. Appl. No. 09/855,992 Charles Eric Hunter et al., filed May 15, 2001.

Connell, N., "Conference on Lasers and Electro-Optics: Perspectives on Printing, Storage and Display," 1996 Tech Digest Series, vol. 9.

DVD-Video Format Book Specification, Version 1.11, published Mar. 1999 by Toshiba Corporation on behalf of DVD forum.

Tsuchiya et al., "High Density Digital Videodics Using 635 nm Laser Diode," IEEE, Aug. 1994, 6 pages.

Sennaroglu et al., "Generation of Tunable Femtosecond Pulses in the 1.21-1.27 um and 605-635 nm Wavelength Region by Using a regenertively Initiated Self-Mode-Locked Cr: Forsterite Laser," IEEE, Aug. 1994, 11 pages.

U.S. Appl. No. 60/169,274, pp. 1-45, filed Dec. 7, 1999, 109 pages.

U.S. Appl. No. 09/707,273, filed Nov. 6, 2000 Hunter et al., 62 pages.

"Circuit City's DIVX Format Bites the Dust!" published Jun. 21, 1999; source: www.hometheater.about.com.

ISO/IEC 13818-1, First edition. "Information technology—Generic coding of moving pictures and associated audio information: Systems." International Organization for Standardization (ISO) and International Electrotechnical Commission (IEC). Apr. 15, 1996. p. 1-6.

PCT International Search Report mailed Nov. 28, 2000, in corresponding International Application No. PCT/US00/23410.

PCT International Search Report mailed May 17, 2001, in corresponding International Application No. PCT/US01/01979.

PCT International Search Report mailed Aug. 28, 2001, in corresponding International Application No. PCT/US01/05675.

Williams, "MP3 All in One", Newsbytes, Jul. 23, 1999, 1 page.

US 5,825,354, 10/1998, Ahmad et al. (withdrawn)

\* cited by examiner

| Step | Mode Name | Description | Hardware Involved |
|---|---|---|---|
| 1 | Selection | Customer looks at recently updated "catalog" of available music selections on his TV using the graphical user interface. Use remote to page through information. | User station, remote, customer TV, stored catalog |
| 2 | Ordering | Customer uses user station, remote and TV screen to order standard or customized CD. Order communicated to central controller by Internet or modem Central controller issues decoding and encryption key(s), selection locations and order number to user station for preview. | User station, modem/Internet, remote, customer TV |
| 3 | Downloading | Music selections are downloaded during early morning transmission hours as encrypted, compressed files through customer's satellite dish and receiver to hard disk in user station. User station selects correct TV channel on receiver using IR link | User station, satellite receiver, video output interface |
| 4 | Decoding | User station uses decoding key(s) to decode downloaded file(s) so that full quality music is on disk drive (or other storage medium) in user station. Customer order number is hidden within this music based upon encryption information received during ordering process. | User station |
| 5 | Previewing | Brief portions of downloaded selections may be "previewed" by the customer along with the entire selection that has been "hobbled" by removing information to degrade music quality and prevent reconstruction of music. | User station, remote, customer's amp, speakers and TV |
| 6 | Playing | Customer plays full-quality selection through his hi-fi or TV sound system with post billing back his account via later modem/Internet communication with the central controller. Playing may include graphics, written jacket information, or hearing impaired cues shown on customer's TV. | User station, remote, customer's amp, speakers and TV |
| 7 | CD Delivery | Full-quality CD that can be heard on any CD player is burned with order number (ID tag) hidden in the music. (Burning process does not need to be quick.) | User station, CD burner, customer supplied CD |
|  | Account Setup | Happens when customer buys and hooks up the user station. |  |

FIG. 2

MUSIC DISTRIBUTION SYSTEM AND ASSOCIATED ANTIPIRACY PROTECTIONS

CROSS REFERENCE TO RELATED APPLICATIONS

This application is a continuation of U.S. patent application Ser. No. 09/487,978, filed Jan. 20, 2000 entitled "Music Distribution System and Associated Antipiracy Protection," which is a continuation-in-part of U.S. patent application Ser. No. 09/476,078 filed Dec. 30, 1999 entitled "Video and Music Distribution System", which is a continuation-in-part of U.S. patent application Ser. No. 09/436,281 filed Nov. 8, 1999 entitled "Video Distribution System", which is a continuation-in-part U.S. patent application Ser. No. 09/385,671 filed Aug. 27, 1999 entitled "Video Distribution System."

FIELD OF THE INVENTION

The invention relates to music distribution and, more particularly, to music distribution systems with built-in safeguards for the prevention of piracy. In certain embodiments, music is blanket transmitted (for example, via satellite downlink transmission) to each customer's computer-based user station. Customers preselect from a list of available music in advance using an interactive screen selector, and pay only for music that they choose to record for unlimited playback. An "ID tag" is woven into the recorded music so that any illegal copies therefrom may be traced to the purchase transaction.

DESCRIPTION OF THE PRIOR ART

Throughout the world today, piracy of software, music and video materials causes significant economic losses to the originators and distributors of these art forms.

Issues of music and video piracy are strongly influenced by the available recording technology. Early forms of music distribution utilized plastic records. The manufacture of records was relatively expensive, requiring the capital expense of record presses and creating metallic master molds. Mold costs had to be amortized over large numbers of copies. The cost of mold masters limited the potential profit from making and selling illegal copies.

With the development of magnetic tape recording, the cost of manufacturing copies became primarily the cost of the raw materials. Copies could be made directly from an original with costs split between the manufacture of a blank tape and the time required to record music on to each tape copy. The manufacture of lower numbers of copies for specialty music was possible and the costs of manufacturing (a pair of tape recorders and some blank tapes) made copying feasible for an individual. However, the degradation in quality from generation to generation of copies was a deterrent as well as the time required to record each copy. The degradation of the sound consisted of loss of high frequencies, a relatively poor signal-to-noise ratio of the recording ("hiss") and tonal or volume variations due to mechanical transport of the tape across the recording head ("wow" and "flutter").

Digital compact disk technology (CD's) again changed the piracy situation by making available high-quality copies of music to consumers in digital form that could potentially be copied with no change or degradation of sound quality. CD's use 16-bit, 44 KHz digital technology so that music recorded on a CD has excellent signal-to-noise ratio, flat frequency response that is wider than human hearing, and no constant or varying pitch distortion. The introduction of CD technology caused significant concern among content providers about the risks of circulating library-quality copies of their music. Small-scale piracy of CD's became common as consumer music "boxes" were sold 5 that had CD players feeding tape recorders. These units allowed CD's to be easily copied although without the full sound quality and convenience of the original CD. On a larger scale, bulk pirate copies of CD's were available, particularly in foreign countries, by companies using relatively expensive CD presses. The presses allowed exact copies of CD's to be made from originals using inexpensive blanks. These same presses also allowed low-cost copying and duplication of software CD's.

Very recently, concerns about music piracy have 15 increased as low-cost CD "burners" became available to consumers making it possible for personal computers not only to read and play music CD's, but also to make copies using relatively inexpensive blank write-once CD's. Today burners are available for under $200 and CD blanks for about $1 20 each. Coupled with multi giga-byte hard disks, copying and editing CD's is widely available.

Today, the threat of copyright violation limits CD piracy. However, due to the cost of prosecution and the difficulty of tracing and confirming the origin of copies, 25 this threat is only practically enforceable against major producers who are caught importing large quantities of CD's, and not individuals or small-scale pirates (e.g., teenagers with computers). As the price of CD burners and writeable CD's continues to fall, music piracy may result in increasing losses in revenue to content providers, especially if the teenage culture (that buys so many CD's) 5 embraces piracy and kids get used to seeing CD's without boxes or colorful paintings on the CD's.

A second technological revolution is also influencing piracy. This is the ability to "compress" the amount of digital data needed to store or communicate music 10 (or video). A one-hour music CD requires about 600 megabytes of data (16 bits/sample*44100 samples/sec*3600 sec*2 channels). This large amount of data has discouraged communication of CD's over the Internet, and storage of the CD in hard drives. However, MPEG 1 15 compression technology reduces the data capacity by a factor of 8 for CD music, making it easier and cheaper to communicate and store. As a result of compression technology it is now economically feasible to communicate music with CD quality over the Internet or to transmit it 20 directly to consumer receivers from satellites. (Similar technology allows a 100-fold compression of video signals making direct-satellite TV and DVD recordings possible.) Furthermore, businesses that sell CD's by shipping them as compressed data streams to a customer's PC with a CD writer 25 to make a final copy will make it common for CD's not to have the elaborate paint jobs of store-sold. CD's and the potential to cause a sudden rise in piracy. It also should also be noted that compression depends upon and has caused powerful digital processing engines to be placed at reception sites for compressed audio or video. These engines make possible the running of protected software 5 (protected software is software that runs the engine but can not be analyzed by outsiders to see how it works or does the encoding or decoding) that can be used for de-encryption or be capable of performing the spectral analysis to add the more complex ID tags that can be used as an aspect of this invention.

Content providers are reluctant to make full-quality music available to consumers via direct satellite broadcasting or the Internet because of the risk that exact copies of their materials, their core asset, will leave their control and freely circulate among consumers resulting in huge losses in revenue to distributors and artists. This financial threat could weaken the recording and entertainment industry in the United States.

SUMMARY OF THE INVENTION

The present invention provides music distribution systems that are beneficial to all involved parties, namely consumers, content providers and data transmission providers. In preferred embodiments, consumers are able to 25 preselect music selections from as many as 400,000 to 500,000 song titles (30,000 to 40,000 CD's) that are transmitted daily. Customers of the music distribution system utilize a menu driven, graphical user interface with simplified controls that provide music selection by title and category (e.g., jazz, classical, rock, etc.). Music content is transmitted via direct broadcast satellite (DBS) 5 in an encoded format directly to each customer's receiving dish or antenna which is linked to the customer's user station where it is initially stored on a suitable storage medium such as a disk drive. The customer may "preview" the stored music for free and thereafter decide whether to purchase a permanent copy. If the purchase decision is made, a full quality CD is recorded via a CD burner that is part of the user station. The customer is billed by the music distribution system operator. Antipiracy protection is provided by weaving an ID tag into the recorded music so that any illegal copies therefrom may be traced to the purchase transaction.

BRIEF DESCRIPTION OF THE DRAWINGS

Some of the features of the invention having been stated, other features will appear as the description proceeds, when taken in connection with the accompanying drawings, in which—

FIG. 2 shows the operational sequence for use of the music distribution system of FIG. 1 by a customer.

DETAILED DESCRIPTION OF THE INVENTION

While the present invention will be described more fully hereinafter with reference to the accompanying drawings, in which aspects of the preferred manner of practicing the present invention are shown, it is to be understood at the outset of the description which follows that persons of skill in the appropriate arts may modify the invention herein described while still achieving the favorable results of this invention. Accordingly, the description which follows is to be understood as being a broad, teaching disclosure directed to persons of skill in the appropriate arts, and not as limiting upon the present invention.

Figure 1:
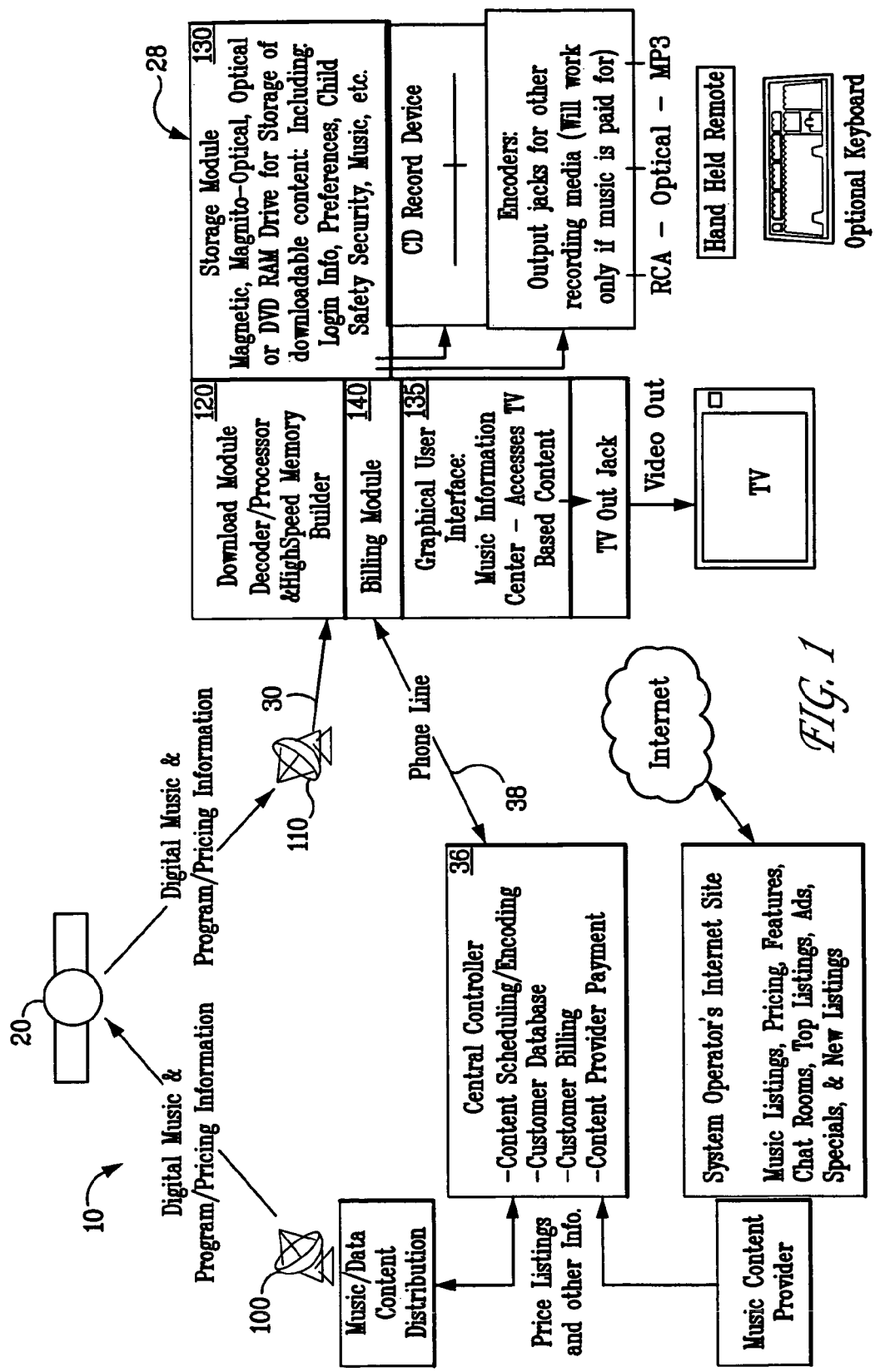
FIG. 1 is a schematic representation of a satellite-based music distribution system.

The Overall Music Distribution System, generally Referring to FIG. 1, there is shown a simple schematic of one embodiment of a music distribution system 10 of the invention. System 10 utilizes direct broadcast satellite (DBS) transmission via satellite 20 as the means 5 for blanket transmitting encoded data, either in real time or in time compressed format (discussed below). The program data is received at each customer household by a receiving antenna or dish 110. Dish 110 is linked to a dedicated "box" or user station 28 by a satellite receiver link 30.

User station 28 is an interactive device permitting customers to preselect desired music selections for recording through the user station. Station 28 communicates at appropriate times with a central controller system 36 via a phone/modem connection 38 (land, Internet or cellular). Central controller system 36 stores a discrete address (e.g., telephone number, credit card number or billing address) for each customer household and receives information via connection 38 to verify that a preselected music selection has been recorded. Central controller system 36 utilizes this information to bill customer households and also to credit the accounts of content providers. The satellite link (or alternatively the central controller system 36) periodically communicates with each customer household to provide information on available music and program/pricing information.

Further details of the distribution system are provided below and in commonly owned U.S. patent application Ser. Nos. 09/385,671; 09/436,281 and 09/476,078, the teachings of which are fully incorporated herein by reference.

The Satellite(s): According to preferred embodiments of the present invention, data transmission is achieved utilizing geostationary satellites operating in the KU band that are downlinked to conventional receiving antennae or dishes located at the customer households.

Following the recent acquisition of PrimeStar's assets by Hughes, there are now two digital broadcast satellite providers in the United States, Hughes (DSS) and EchoStar (DISH Network). EchoStar's DISH network launched an additional satellite in September 1999 (its fifth satellite) that, in combination with its previous satellites, provides continuous transmission of greater than five hundred channels to substantially the entire continental United States. EchoStar now has satellites located in the 119, 110, 61.5 and 148 positions within the Clark Belt.

With the above satellite orientations, EchoStar's new "DISH 500" system utilizes an elliptical twenty inch antenna or dish containing two LMBS heads that can receive information from two different satellites simultaneously. As mentioned above, this system permits greater than five hundred channels to be directly broadcast to each customer household.

Currently preferred embodiments of the present invention utilize the EchoStar system, most preferably the DISH 500 system, for data transmission at either real time or time-compressed transmission rates, discussed below. In alternative embodiments, the invention may be implemented utilizing the Hughes (DSS) system, or a combination of both the Hughes and EchoStar systems (resulting in a relatively smaller portion of each system's total capacity being devoted to the invention's video distribution).

Data Transmission Parameters: EchoStar's DISH 500 system provides a very high band width of approximately 4 megabits/sec for each channel (23 megabits/sec per transponder), for a total transmission capacity of approximately 2000 megabits/sec for five hundred channels.

It will be appreciated that instead of using more typical 120 watt DBS transponders, implementation of the present invention may be carried out with higher power transponders (e.g., 240 watt transponders) to increase the effective transponder capacity (e.g., from 23 megabits/sec to 30 megabits/sec) by reducing much of the capacity 25 allotted for forward error correction and system management inherent in lower power transponders. Also, along with the use of higher power transponders, the invention may be carried out with quanternary (QPSK) polarization to double the effective bit transfer rate for each transponder over that which may be obtained by using current orthogonal polarization—with a sacrifice in bit error rate that is 5 acceptable for those applications of the invention where lower video and audio resolution is not an important consideration to the customer. Thus, the use of high power transponders (e.g., 240 watts or higher) in conjunction with higher level polarization (e.g., quanternary) permits music distribution systems of the invention to be implemented utilizing less of the DBS system's total transmission capacity, permits the transmission of a greater number of music selections or other content and permits greater time compression of the transmitted data, or a combination of the above, all to the benefit of consumers.

Details of the User Station and Operation: Referring again to FIG. 1, music content providers deliver music in digital form to the central controller 36 of the music distribution system. The content is encoded utilizing an encoding technology that is well known in the art, such as interlaced coding techniques in combination with a unique header code that identifies each title. In certain embodiments, only the unique header coding is employed to identify each specific title. It is also understood that the header code can also identify the exact transmission time of each title. The header code containing transmission times can be digitally communicated to the operating system of the user stations 28 to prevent unauthorized reception and subsequent duplication of digital music content. In addition, it is also understood that 5 selection of a specific title by the user can require a completed payment before activation of initial reception and storage of the digital music content, or before the digital music content is recorded on any other device or media.

The encoded music content is scheduled and transmitted to the direct broadcast satellite up-link facility 100 by the system operator through central controller 36. In addition, periodic digital program/pricing information is transmitted to the up-link facility, for example, every ten minutes. While it is understood that direct broadcast satellite transmission currently operates in the KU Band, other frequencies can also be employed to achieve similar results. It is understood that the music content can be transmitted at real or time compressed speeds. In preferred embodiments, music content is transmitted at faster than real time speeds, where real time speeds refer to the playback speed of the recorded music. For example, a single satellite transponder capable of 23 megabits/sec transmission can transmit a typical 4 minute song in less than 4 seconds. Thus, EchoStar's DBS programming capacity (discussed above) allows transmission of 400,000 to 500,000 song titles (approximately 30,000 to 40,000 CD's) during a four hour period, most preferably curing a period of low viewership, e.g., 1:00 AM to 5:00 AM.

The digital music content and program/pricing information, once received by the appropriate satellite, are then transmitted down broadly (i.e., "blanket transmitted") to geographic coverage areas where the user stations can receive the downlink transmissions.

The music program and pricing information are received by the home user's satellite dish 110 and transmitted to download module 120 contained in the user station where it is decoded and stored digitally in storage module 130 also contained in the user station.

The customer preselects music content to be downloaded by selecting the content utilizing the graphical user interface 135 shown on the TV screen. The order is communicated to central controller 36 by Internet or modem. Pricing information for the preselected music content is then transmitted to the billing module 140 contained in the user station where it is stored in nonvolatile memory such as SRAM for subsequent querying via the phone line by central controller 36.

The music content preselected by the customer is blanket transmitted by satellite 20 at the scheduled time and is received by the home user's satellite dish 110. This music content is transmitted to download module 120 where it is decoded and stored digitally in storage module 130.

In certain embodiments, the user station 28 will also contain an audio speaker system (not shown) to allow the customer to "preview" the stored music before it is recorded permanently on a CD or other recordable medium and 5 subsequently paid for. In this embodiment, the preselected pricing information stored in billing module 140 will not be transmitted for payment to the system operator until the customer has either listened to the music content a set number of times, for example, 3 times, or the customer indicates via the graphical user interface that he wishes to permanently record it. As an alternative, previewing may be accomplished by playing a highly compressed "preview" copy through the customer's speaker system or headphones. Highly compressed material lacks richness, signal to noise ratio, stereo channels and high-frequency bandwidth. Preview can be communicated in perhaps 1% to 10% of the final copy depending upon the compression schemes used. Each preview has a brief section (20 seconds) of the real sound of the selection to allow the customer to really sample the material as well as generate interest in paying for a "good copy". If desired, the preview material may be further hobbled with some simple distortion, added noise, limited low end, crackles and pops, voice overlay, missing sections, sliding notches, amplitude compression. Content providers may be given choice as to the nature of the hobbling beyond the heavy transmission compression.

When the customer decides to purchase the music, the graphical user interface prompts the customer to insert a recordable medium such as a writeable CD into the user station, or attach other recording device to the user 5 station's output connectors. (In certain cases, the customer may choose to record preselected music content multiple times. In such cases the music content provider may offer pricing discounts for multiple recordings.) The user station records the preselected music content stored in the user station and then either deletes the music contained in storage module 130 once the recording has been completed or allows the customer to manually delete content no longer desired.

The customer accesses (or navigates) the graphical user interface via a hand held remote. In preferred embodiments, the remote control communicates via infrared LED transmitter to an infrared sensor contained on the user station. An optional keyboard can be utilized by the customer to access (or navigate) the graphical user interface via the same infrared sensor contained on the user station.

Figure 3:
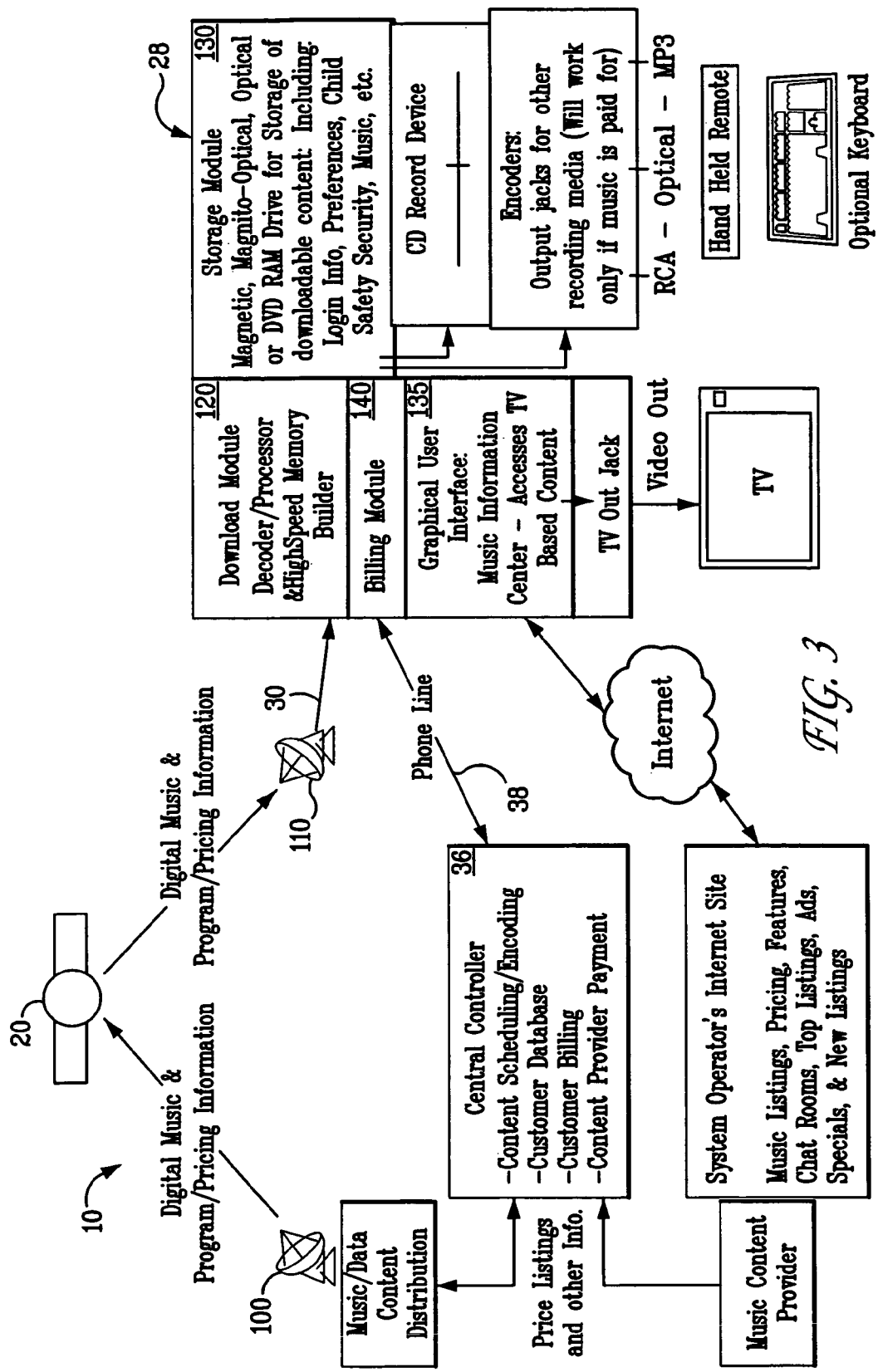
FIG. 3 shows another music distribution system wherein the user station includes an Internet browser and processor enabling customers to access the system operator's music Internet site via phone line or Internet connection.

The above sequence of operation is summarized in FIG. 2, which is largely self explanatory. The illustrated modes of operation, following account setup, are identified as:
1. Selection
2. Ordering
3. Downloading
4. Decoding
5. Previewing
6. Playing
7. CD Delivery FIG. 3 illustrates another embodiment wherein the user station contains an Internet browser and processor that enables the customer to access the system operator's music Internet site via phone line or other Internet connection.

Figure 4:
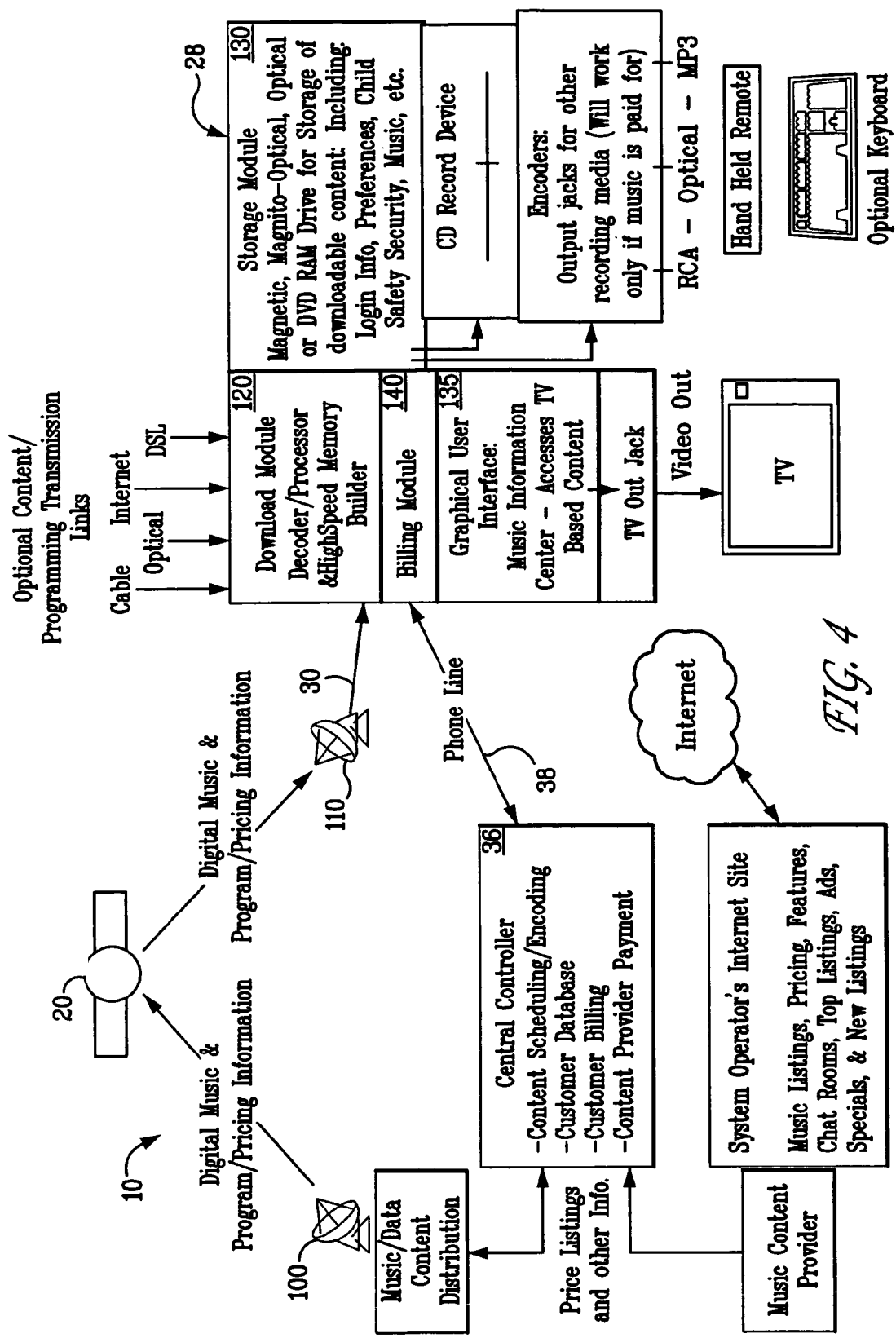
FIG. 4 shows yet another music distribution system depicting optional content/programming transmission links.

Optional digital content/programming transmission links are shown in FIG. 4. These include, but are not limited to, cable, optical fiber, DSL and the Internet.

Piracy Protection: The threat of piracy can be controlled through a music distribution system that uniquely labels every legal CD copy of music (or video) with an "ID tag". Thus, if a customer sells copies of a CD that he purchased, that copy and any copies of it can be traced to his original purchase. Such identification serves as the basis of a legal deterrent for large or small-scale piracy. Furthermore, the ID tag may be contained in each song of a CD protecting each complete piece of artistic material. The ID tag may be as simple as an inaudible millisecond blip at the start of each selection or may be "woven" into the music so that it survives re-recording and compression schemes by being integral to the music, but not noticeable to the listener or easily discovered by potential pirates. Multiple hidden tags may be used to discourage attempts to remove the code 5 by comparing multiple legal copies of the music. Similarly, multiple tags also provide the advantage of identifying illegal copies in those cases where a pirate successfully removes some, but not all, of the tags. At worst, a pirate may successfully remove part of the tags making it possible to determine that the music copy is illegal, but without identifying the original purchaser.

Distributing music that contains unique ID tags limits piracy by making it possible to prove that a CD is an illegal copy and makes the legal source of the copy identifiable. This technology makes it financially feasible to distribute full-quality CD music (or video) to consumers via direct satellite connections in the manner described above in connection with FIGS. 1-4. Furthermore, by placing tags in each song, it makes it possible to have a protected system of allowing consumers to create unique assortments of songs on a CD, and for artists and distributors (content providers) to receive revenues for each song used. Thus, each home can become a "CD or music factory" where a person can create their own collection of 25 songs by artists, through a system in which the original artist and distributor are properly paid for their materials. Furthermore, the decline in piracy resulting from the threat of legal prosecution could result in more legal copies of music being purchased so that providers can charge less per legal copy so that this art is more widely available.

The two major venues for distribution of protected CD's are the Internet and satellite. In the Internet case, a customer contacts an Internet site where they purchase the CD. The site places ID Tags in the music or video selected, then compresses the selection and sends it to the purchaser. The purchaser then de-compresses (inflates) the selection and stores it on his hard drive or writes it to a blank CD for later playing. In the case of satellite distribution, a customer contracts over a phone or Internet connection to purchase a particular CD. At regular intervals, perhaps once a day, the satellite company compresses this CD, encrypts it and then blanket broadcasts it. The customer's receiver (e.g., user station 28, above) stores the transmission and then de-encrypts it using a system and key supplied by the satellite company, and then that same system encodes an ID TAG in the music (or soundtrack) using a TAG number downloaded from the satellite company during the purchasing transaction. Both the Internet delivery system and the satellite delivery system create a customer CD that may be played on any conventional CD player. Both the Internet and satellite distribution systems archive the ID Tag information with the customer's identity and perhaps other aspects of the transaction. This data may be sent back to the original content provider or to another company specializing in detecting and prosecuting pirates.

The above scheme may also be applied to CD's sold in stores. In this case, each CD has a unique ID tag 5 encoded before it is distributed to the store. The CD case has a bar code associated with the ID Tag. At the time of purchase the bar code is associated with a customer's charge card or identity. This information is then sent back to the CD manufacturer.

It will be appreciated that it is possible to encode an ID TAG into a music selection so that it will not be heard during normal playback, but could remain and be detectable in a recording made from a selection played over the radio.

The description will now turn to a detailed discussion of representative ID tags. As stated above, an ID tag uniquely identifies each copy of music or video. In its most simple form, a 10 digit (37 bit) tag may be stored in three 16-bit samples (1/12,000 of a second long) on a CD. A three-byte tag number equivalent to full volume is a barely perceptible pop to young, sensitive ears and is completely inaudible to the majority of the population. In a more complex form, the tag may be woven into the frequency or time spectrum of the music, where it is both inaudible and survives compression and transmission, or even serious attempts by hackers to remove the tag. While the simple tag may be appropriate for certain applications, more complex tags may be desired for other applications, especially for high-profit, piracy-prone contemporary music (or video).

A simple tag, as discussed immediately above, may consist of three 16-bit numbers placed at the start and/or 5 end instant of a CD or each of its songs. To limit audibility, the 37 bits may be carried by the 64 bits of the first four samples at the beginning of the CD and encoded to have low amplitude or alternating polarity to further hide its audible presence from consumers. Such a tag may be easily read by a computer and is not difficult to eliminate when making copies. However, the technical nature of tag removal coupled with the legal implications of distributing software capable of destroying the tag serves as a significant deterrent to general piracy.

The complex ID tag is inaudible by humans, yet is sufficiently integral to the music (or video) that it remains during simple filtering or compression operations. The ID tag may be a multidigit number (or collection of bits) that can be read or recovered from the CD by those who originally placed the tag. Examples of tags are low bit-rate encoding in low amplitude, high frequency music content, short-duration ratios of harmonic components, background sounds, slight shortening or lengthening of sustained sounds, or even small shifts in localization cues for a sound object. Key to "hiding" the sounds is to encode the bits as short duration shifts in the sounds, shifts that are preserved during compression but that are not detectable by normal human hearing or attention. In other words, it is desirable to take advantage of the parts of the music that have "excess information" coded during sound compression that is not noticed by humans.

To make the complex tag hidden and recoverable additional information must be used in reading the tag that is not contained in the CD. This information describes where the real (or perhaps false) ID tags are to be placed, and what the nature of the bit encoding is at that location. The simplest form of location would be milliseconds from the start or end of the song for each bit. Similarly, time from a particular feature in a song, like milliseconds after the attack greater than 20 dB about 23 seconds into the song, could be used to identify the location of one bit of an ID tag. Obviously many bits are also encoded that obscure the actual tag bits. Real and actual bits may be different or interchanged among different legal copies of a song.

It should be expected that as music (or video) compression techniques evolve, methods for placing and retrieving ID tags will also evolve.

How and where is the ID tag placed? In its simplest form, the ID tag is a unique identifying number, ID NUMBER, that is placed at the start, end or between selections on a copy of the CD when it is produced for the consumer. As stated above, a unique ID NUMBER might be placed on each CD as it is manufactured and later associated with a customer name or credit card during a store purchase. Or, in one preferred manner of carrying out the inventions, the ID NUMBER might be inserted during the process of writing a CD with music that is downloaded from a satellite or the Internet. In this case, the software accomplishing 5 the transaction to purchase the music also sees that the ID NUMBER is obtained from the seller and places this ID NUMBER at appropriate places in the CD during the recording process.

Looking at a more complex form of the ID tag, when a legal CD is distributed over the Internet, via direct satellite transmission or even CD's that are manufactured for sale in CD stores, preferably two blocks of information are involved. The first block, called the "location data", is an encrypted description of all the locations in the music to contain the entire or part of the ID tag, and the encoding techniques used for each location in which false or real bits of the ID tag will be placed. The LOCATION DATA is used in creating or reading the ID NUMBER but is not stored on the CD. The second block of information, called the ID number, is a unique number identifying the legal transaction. The ID number may be a customer identification number, like a credit card or phone number, or customer purchasing account number, or may be a seller generated transaction number. There are many different schemes for filling redundant ID tags encoded on a CD so that tampering or removal of any tag or part of a tag is noticed.

Some types of tags may be placed in the time domain and others in the frequency domain. Time domain tags may involve changing an aspect of a time-domain feature like the decay time for a note, whereas frequency domain features 5 such as amplitude of an overtone would be better inserted in a frequency domain transform like the fast Fourier transform used to do MPEG 1 compression. The amount of computer speed needed to insert frequency domain tags has only been recently available in consumer computers.

LOCATION DATA is communicated to a "home music factory" (e.g., user station 28) as encrypted information sent with the compressed music. If an ID NUMBER were 10 digits (about 33 bits) long then perhaps just 33 or several hundred locations would be contained in the LOCATION DATA. Software may accomplish this task at the site of music distribution, picking regions of the sound that are suitable for hiding bits within, or trial bits may be encoded by software with trained observers, perhaps the person who mixed or originated the music confirming that the music was not degraded by the inclusion of the bits.

ID NUMBER would be contained in the music factory as a standard ID number or as a number securely given to the purchaser during the purchase transaction. One number might be given for a whole CD or individual numbers for each song on the CD might be given.

The customer's security information should not only contain the LOCATION DATA and ID TAG but instructions for creating each type of encoding of a bit in the fabric of the music. Types and encoding of bits needs to be kept a secret so that the search and removal of encoded ID'S will be more difficult. It is also likely that types of encoded 5 cues will evolve over time.

Note that a unique ID tag can be encoded in the manufacture of a CD for sales in a store as well as a bar coded copy on the CD box allowing association of a purchaser's identity (or credit card number) with that legal copy. Similarly CD's delivered in compressed form over the Internet can have the complex tags woven into the audio at the delivery end. Complex tags can be designed that are not affected by the compression-decompression process.

How are the ID tags immune from destruction? The simple ID TAG consisting of three two-byte samples could easily, but illegally, be eliminated during a piracy operation with the proper software. However the more complex encoding schemes are very difficult to find in order to eliminate or change it.

To be immune from destruction the encoded bits should not affect a person's perception of the music. This is not difficult since the information content of even compressed music is orders of magnitude beyond the capacity of humans to take in information. However, since humans attend to different aspects of music at different times, encoding must be carefully done.

Hints of types of acceptable encoding come from knowledge of what aspects of sound are most carefully attended by humans. For example, quick rise-times or strong attacks are carefully processed for localization cues, and frequency or pitch can be sensed with great accuracy by some persons. The literature on the development of music compression algorithms contains discussions of what aspects of music must be carefully preserved and what is less noticed but nevertheless kept due to the need to preserve other, similar, features in the encoding.

It will be appreciated that it is possible to place both a simple and a complex ID number on a CD as a method to determine the purchaser of a CD that was subsequently altered and copied.

Figure 5:
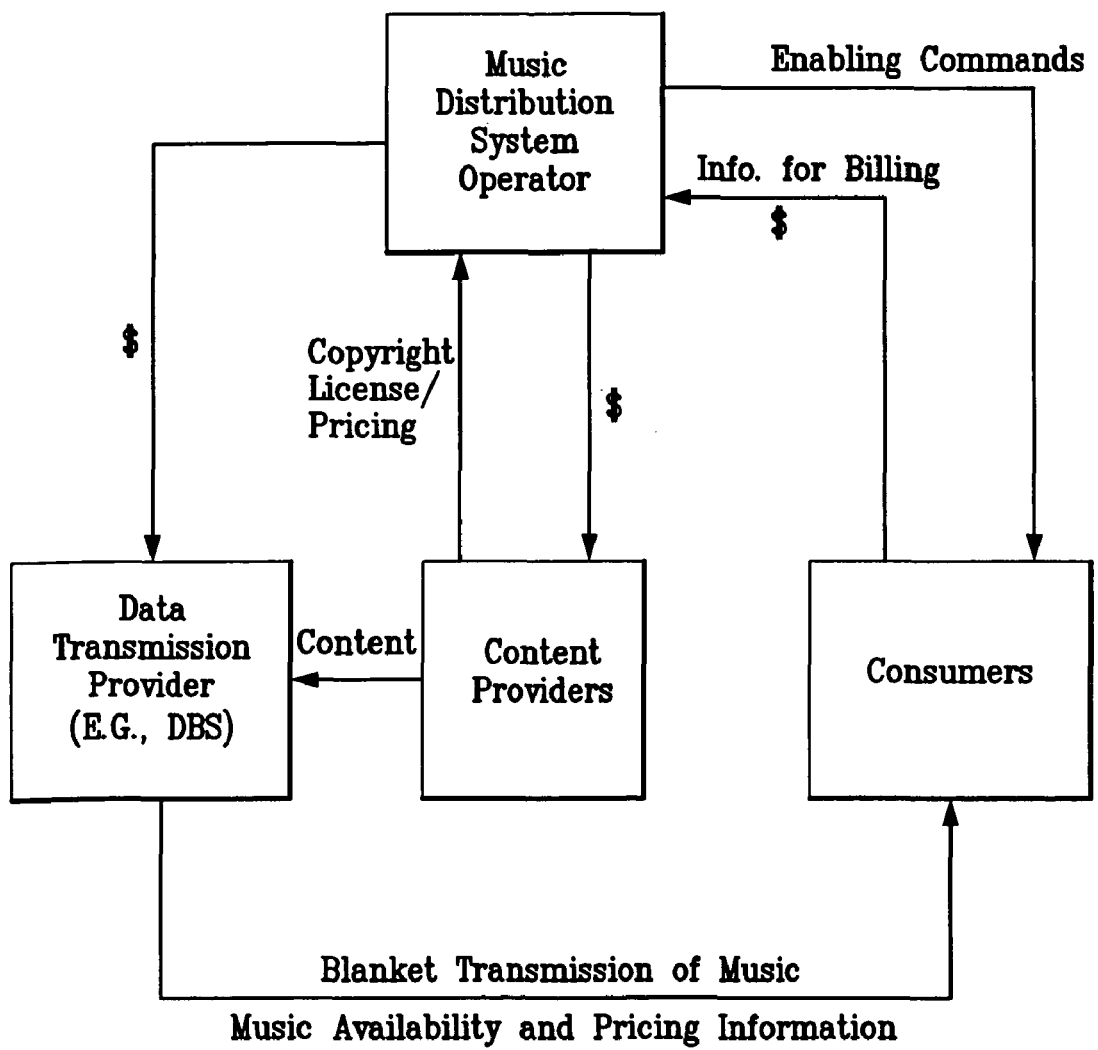
FIG. 5 is a block diagram of one simplified embodiment of a business model for commercializing a music 10 distribution system.

Business Models: The present invention provides significant flexibility with respect to the business model to be used to commercialize the invention. In one simplified embodiment, shown in block diagram form in FIG. 5, the music distribution system operator interfaces with three parties, the data transmission provider, the content providers, and consumers. The content providers provide content to the data transmission provider which, in turn, blanket transmits the content to the consumers, preferably by direct broadcast satellite. The satellite transmission also includes content availability/scheduling data and content pricing data, updated periodically. The content providers also provide copyright license and pricing requirements to the video distribution system operator. Both the data transmission provider and the content providers receive payments directly 5 from the music distribution system operator. Lastly, the music distribution system operator periodically receives information for billing, while also sending enabling commands to the consumers.

While the present invention has been described in connection with certain illustrated embodiments, it will be appreciated that modifications may be made without departing from the true spirit and scope of the invention.

What is claimed:

1. A device comprising:
  a communication mechanism configured to communicate with a data transmission device;
  a pre-selection mechanism configured to enable a consumer to pre-select, from a transmission of a plurality of music content items, specific music content items for storage at a consumer location;

a first storage medium configured to store music content items before the consumer is charged for the music content items;

a player mechanism configured to play music content items from the first storage medium, wherein the device is configured to initiate a transaction to charge the consumer a fee for one-time play of the music content item in response to a music content item being selected by the consumer for playing; and a second storage medium configured to store music content items from the first storage medium, wherein the device is configured to initiate a transaction to charge the consumer a one-time fee for unlimited play of the music content item in response to music items being selected by the consumer for storage on the second storage medium.

2. The device of claim 1, further comprising:
a play list; and
a player capable of playing said play list in any sequence at any time.

3. The device of claim 2, wherein said player is capable of ordering said sequence in continuous playback, shuffle, sort-by-artist, sort-by-title or sort-by-category.

4. The device of claim 1, wherein a portion of said first storage medium is dedicated to the storage of pre-selected music selections.

5. The device of claim 4, wherein said first storage medium comprises a hard drive.

6. The device of claim 1, wherein said pre-selection mechanism comprises: a menu driven, graphical user interface with controls to provide music selection by artist, title and category.

7. The device of claim 1, wherein said pre-selection mechanism comprises a consumer preference mechanism configured to store consumer preferred music styles and to enable selection of said music styles by a consumer at said consumer location.

8. The device of claim 7, wherein said consumer preference mechanism comprises a graphical user interface with a music style preferences list.

9. The device of claim 7, wherein said consumer preference mechanism comprises: a graphical user interface with music style, subgroup and artist preferences lists for a more detailed selection by said consumer.

10. The device of claim 1, further comprising:
an individual consumer catalog based on individual consumer preference information;
a mechanism for reading ID headers on the pre-selected music content items and operable such that only those music content items that are indicated by said individual consumer catalog as being desirable to the consumer are selected for recording.

11. The device of claim 1, further comprising: a download module configured to decode pricing information and said transmitted music content items.

12. The device of claim 1, wherein the first storage medium comprises the second storage medium.

13. The device of claim 1, wherein the second storage medium is a portable storage medium.

14. A user station enabling a consumer to store and playback music items at a consumer location, the user station comprising:
a receiver configured to receive a transmission of a plurality of music content items;
a pre-selection mechanism capable of enabling a consumer to pre-select, from the transmission of a plurality of music content items, specific music content items for storage at the consumer location;
a first storage medium capable of storing music content items from the transmission before the consumer is charged for the music content items, the music content items including a first music content item and a second music content item;
a second storage medium capable of storing the first music content from the first storage medium, such that if the first music content item is selected by the consumer for storage on the second storage medium, a transaction is conducted wherein the consumer is charged a one-time fee for unlimited play of the first music content item and an identification tag associated with the transaction is embedded in the first music content item stored on the first storage medium;
a playback selection mechanism capable of enabling said consumer to:
playback the first music content item from the second storage medium, wherein the consumer is not charged for playback of the first music content item, and
playback the second music content item from the first storage medium, wherein the consumer is charged a fee for one-time playback of the second music content item; and
a content access mechanism capable of enabling the user station to access a content library, said content library comprising said music content items stored in the first storage medium and the second storage medium.

15. The system of claim 14, further comprising:
a play list of said content library; and
a player capable of playing said play list in any sequence at any time.

16. The system of claim 15, wherein said player is capable of ordering said sequence in continuous playback, shuffle, sort-by-artist, sort-by-title or sort-by-category.

17. The system of claim 14, wherein a portion of the first storage medium is dedicated to the storage of music content items.

18. The system of claim 17, wherein said first storage medium comprises a hard drive.

19. The system of claim 14, wherein said pre-selection mechanism comprises: a menu driven, graphical user interface with simplified controls providing music selection by artist, title and category.

20. The system of claim 14, wherein said pre-selection mechanism comprises a consumer preference mechanism configured to store consumer preferred music styles and to enable selection of said music styles by a consumer at said consumer location.

21. The system of claim 20, wherein said consumer preference mechanism comprises a graphical user interface with a music style preferences list.

22. The system of claim 20, wherein said consumer preference mechanism comprises: a graphical user interface with music style, subgroup and artist preferences lists for a more detailed selection by said consumer.

23. The user station of claim 14, wherein the first storage medium comprises the second storage medium.

24. The user station of claim 14, wherein the second storage medium is a portable storage medium.

25. A method of distributing music comprising:
providing information to a user device, the information identifying available music content items to be transmitted;

embedding an ID tag in at least one encoded pre-selected music content item, said ID tag comprising data associated with a purchase transaction for the music content item;

transmitting the at least one encoded pre-selected music content item to the user device for storage on a first storage medium before the consumer is charged for the at least one encoded pre-selected music content item; and verifying if the at least one encoded pre-selected music content item has been recorded on a second storage medium that is operably coupled to the first storage medium.

26. The method of claim 25, further comprising enabling the user device to pre-select and record desired transmitted music content items.

27. The method of claim 26, further comprising transmitting to the user device a content library comprising said encoded pre-selected music content items.

28. The method of claim 26, further comprising enabling the user device to play recorded music content items according to a consumer created play list, said play list being arranged to play said recorded music content items in a desired sequence at a desired time.

29. The method of claim 28, further comprising enabling the user device to present a menu driven, graphical user interface for user selection of said music content items.

30. The method of claim 26, further comprising causing said music content items to be transmitted by direct broadcast satellite data transmission.

31. The method of claim 26, further comprising enabling the user device to permit a consumer to select consumer preferred music styles using a graphical user interface having a musical style preferences list.

32. The method of claim 31, further comprising enabling the user device to permit said consumer to select additional consumer preferences of music subgroups and artists using said graphical user interface having additionally a subgroup preferences list and an artist preferences list.

33. The method of claim 25, wherein the first storage medium comprises the second storage medium.

34. The method of claim 25, wherein the second storage medium is a portable storage medium.

35. A system for distributing music to a plurality of user stations, wherein the user stations are configured to receive a user selection of a transmitted encoded music content item store the selected transmitted encoded music content item, send an indication of the user selection, decode the stored encoded music content item if enabled, receive a key unique to the music content item selected by the user to enable the decoding, embed an ID tag in the decoded music content item, said ID tag comprising data associated with a purchase transaction for the music item, and supply the decoded music content item to the user, the system comprising:

a transmitter configured to blanket-transmit a plurality of encoded digital music content items to the plurality of user stations;

a central controller connectable to the user stations and comprising a first input terminal configured to receive from a user station an indication of a user selection of a transmitted music content item and a first output terminal configured to transmit to the user station a key unique to the selected music content item; and a billing system associated with the central controller configured to bill the user stations, wherein the billing system is further configured to process payment transactions from the user stations and the central controller is further configured to transmit the key only if a payment transaction for the key is completed in advance of the key transmission.

36. A system as recited in claim 35, wherein said transmitter is configured to blanket-transmit music content items via a direct broadcast satellite system.

37. A system as recited in claim 35, wherein said transmitter is configured to blanket-transmit music content items at a data transmission rate faster than real time.

38. A system as recited in claim 35, wherein said system is configured to transmit music selection content availability, scheduling and content pricing information.

39. A system as recited in claim 38, wherein the central controller is configured to enable at least one of said user stations to:

permit pre-selection and recording of transmitted music content items in a storage medium;

receive transmission of at least one music content item and record the received at least one music content item in a storage medium;

enable selection of a previously recorded music content item, that was previously recorded in the storage medium, for unrestricted playback; and communicate unrestricted playback selection information regarding a previously recorded music content item, that was previously recorded by the user in the storage medium, to a central controller system, said unrestricted playback selection information having been generated automatically upon determining that the previously recorded music content item has been played at least a predetermined number of times at a user location.

40. A system as recited in claim 39, wherein the central controller is configured to provide at least one of the plurality of user stations with an interactive program guide mechanism that enables selection of available digital music content and enables selection of functions for recording said music content items and functions for playing back recorded music content items.

41. A system as recited in claim 39, wherein the central controller is configured to cause at least one of said user stations to store decoded music content items and associated information in a digital data storage device.

42. A system as recited in claim 39, wherein the central controller is configured to cause at least one of said user stations to remotely access said content availability, scheduling and content pricing information.

43. A system as recited in claim 42, wherein the central controller is configured to enable remote access by said at least one of said user stations via an Internet link to a website of a content provider.

44. A system as recited in claim 42, wherein the central controller is configured to enable remote access by said at least one of said user stations via a phone line.

45. A system as recited in claim 39, wherein the central controller is configured to provide at least one of said user stations with a mechanism that is configured to enable a user to listen to a decoded and stored music content item one or more times on a no-charge basis.

46. A system as recited in claim 45, wherein the central controller is configured to provide at least one of said user stations with a mechanism that is configured to receive a permanent enabling code that is provided subsequent to the recording of a music content item, said permanent enabling code operating in cooperation with said recorded music content item selected for unrestricted playback to thereby enable said unrestricted playback.

47. A system as recited in claim 35, wherein the central controller is configured to enable at least one user station to receive music content from a direct broadcast satellite up-link facility, and to receive program/pricing information transmitted to said up-link facility on a periodic basis.

48. A system as recited in claim 35, wherein the central controller is configured to cause at least one user station to embed an ID tag in at least one song decoded and permanently recorded by the at least one user station.

49. A system as recited in claim 48, wherein the ID tag comprises an inaudible blip at the start of each song.

50. A system as recited in claim 48, wherein the ID tag comprises a 10-digit code stored in three 16-bit samples of a song.

51. A system as recited in claim 48, wherein the ID tag comprises 37 bits carried by the first four samples at the beginning of each song.

52. A system as recited in claim 48, wherein the ID tag is encoded to have alternating polarity so as to hide its audible presence from listeners.

53. A system as recited in claim 48, wherein the ID tag is integrated into the music such that it survives re-recording and compression but is not noticeable to a listener.

54. A system as recited in claim 48, wherein the central controller is configured to cause the at least one user station to embed multiple hidden ID tags into at least one song.

55. A system as recited in claim 48, wherein the system is configured to archive the ID tag with consumer identity information.

56. A system for associating a digital music content item with a purchaser, the system comprising:
- a digital music content item embodied in a portable digital storage medium and having an ID tag encoded therein, the ID tag comprising data associated with a purchase transaction for the digital music content item;
- a case for the portable digital storage medium, the case having indicia of a code corresponding to the ID tag; and
- a data store for storing information relating a purchaser of the digital music content item to the ID tag and to the indicia of the code corresponding to the ID tag.

57. A system as recited in claim 56, wherein the indicia of a code corresponding to the ID tag is a bar code.

58. A user station, comprising:
- a receiver configured to receive a user selection of a transmitted encoded music content item;
- a module configured to store the selected transmitted encoded music content item;
- an output mechanism configured to send an indication of the user selection;
- a decoder operable to decode the stored encoded music content item;
- a receiver configured to receive a key to enable the decoder, wherein the key is unique to the music content item selected by the user;
- an anti-piracy mechanism configured to embed an ID tag in the decoded music content item, said ID tag comprising data associated with a purchase transaction for the music item; and
- an output mechanism configured to supply the decoded music content item to the user from the decoder.

59. The user station of claim 58, further comprising:
- a permission mechanism configured to permit recording of the decoded music content item in a storage medium for unrestricted playback;
- a recording mechanism configured to record the decoded music content item in the storage medium for unrestricted playback; and
- a communication mechanism configured to communicate information regarding recording of the decoded music content item in the storage medium for unrestricted playback, to a central controller system, said information regarding recording of the decoded music content item being generated automatically upon the recording of the decoded music content item.

60. The user station of claim 59, wherein said permission mechanism configured to permit recording comprises an interactive program guide mechanism that enables selection of available digital music content items, that enables selection of functions for recording said music content items, and functions for playing back recorded music content items.

61. The user station of claim 59, wherein the user station is configured to receive a permanent enabling code that is provided subsequent to the recording of a music content item, and wherein the permission mechanism permits unrestricted playback of the recorded music content item in response to receiving the permanent enabling code.

62. The user station of claim 58, further comprising:
- a remote access mechanism configured to enable remote access to content availability, scheduling and content pricing information.

63. The user station of claim 58, further comprising:
- a free trial mechanism configured to enable a user to listen to a decoded music content item one or more times on a no-charge basis.

64. The user station of claim 58, wherein the user station is configured to receive the selected transmitted encoded music content item from a direct broadcast satellite up-link facility, and is further configured to receive program pricing information transmitted from said up-link facility on a periodic basis.

65. The user station of claim 58, wherein the anti-piracy mechanism is configured to embed an ID tag in at least one song decoded and permanently recorded by a user station.

66. The user station of claim 65, wherein the ID tag comprises an inaudible blip at the start of each song.

67. The user station of claim 65, wherein the ID tag comprises a 10-digit code stored in three 16-bit samples of a song.

68. The user station of claim 65, wherein the ID tag comprises 37 bits carried by the first four samples at the beginning of at least one song.

69. The user station of claim 65, wherein the ID tag is encoded to have alternating polarity so as to hide its audible presence from listeners.

70. The user station of claim 65, wherein the ID tag is integrated into the music such that it survives re-recording and compression but is not noticeable to a listener.

71. The user station of claim 65, wherein the anti-piracy module is configured to embed multiple hidden ID tags into at least one song.

* * * * *

UNITED STATES PATENT AND TRADEMARK OFFICE
CERTIFICATE OF CORRECTION

PATENT NO. : 8,019,688 B2
APPLICATION NO. : 11/085944
DATED : September 13, 2011
INVENTOR(S) : Hunter et al.

Page 1 of 1

It is certified that error appears in the above-identified patent and that said Letters Patent is hereby corrected as shown below:

Title Page 5, item (56), under "Other Publications", in Column 1, Line 21, delete "http;//www." and insert -- http://www. --.

Title Page 6, item (56), under "Other Publications", in Column 1, Line 3, delete "regenertively" and insert -- regeneratively --.

Column 13, line 46, in Claim 35, delete "item" and insert -- item, --.

Signed and Sealed this
Sixth Day of March, 2012

David J. Kappos
*Director of the United States Patent and Trademark Office*